United States Patent [19]

Helbig, Sr.

[11] Patent Number: 5,751,740
[45] Date of Patent: May 12, 1998

[54] ERROR DETECTION AND CORRECTION SYSTEM FOR USE WITH ADDRESS TRANSLATION MEMORY CONTROLLER

[75] Inventor: Walter A. Helbig, Sr., Medford Lakes, N.J.

[73] Assignee: Gorca Memory Systems, Cherry Hill, N.J.

[21] Appl. No.: 575,922

[22] Filed: Dec. 14, 1995

[51] Int. Cl.$^6$ .................... H03M 13/00; G06F 11/10
[52] U.S. Cl. ............. 371/37.1; 371/40.1; 395/182.04; 395/185.06
[58] Field of Search ................... 371/37.1, 40.1; 395/182.04, 185.06

[56] References Cited

U.S. PATENT DOCUMENTS

| | | | |
|---|---|---|---|
| 3,562,709 | 2/1971 | Srinivasan | 340/146.1 |
| 3,565,107 | 2/1971 | Hsiao et al. | 340/146.1 |
| 3,629,824 | 12/1971 | Bossen | 340/146.1 |
| 3,671,947 | 6/1972 | Bossen | 340/146.1 |
| 3,697,948 | 10/1972 | Bossen | 340/146.1 |
| 3,755,779 | 8/1973 | Price | 340/146.1 |
| 4,092,713 | 5/1978 | Scheuneman | 395/185.06 |
| 4,107,652 | 8/1978 | Tanahashi et al. | 340/146.1 |
| 5,291,496 | 3/1994 | Andaleon et al. | 371/3 |
| 5,325,488 | 6/1994 | Carteau et al. | 395/275 |
| 5,379,415 | 1/1995 | Papenerg et al. | 395/575 |
| 5,509,119 | 4/1996 | La Fetra | 395/185.05 |

*Primary Examiner*—Stephen M. Baker
*Attorney, Agent, or Firm*—Allan Jacobson

[57] ABSTRACT

A data transmission system for use in a mass memory system includes a unique EDAC which corrects all single component errors and detects all double component errors. High speed operation permits use of the EDAC on address and control lines as well as on data lines. In memory systems which use virtual memory addressing, further efficiency and economy is achieved by incorporating a partial implementation of the EDAC encoding in the same virtual memory address translation unit in which virtual memory address are calculated. False indications of error are avoided by ANDing the signals which indicate the location of an error, with an inclusive OR of all the bits which indicate the existence of an error but not the location of the error. In such manner, the error location signals are set to zero when the error detection bits indicate that there are no errors.

32 Claims, 12 Drawing Sheets

FIG. 2
(PRIOR ART)

MEMORY MODULE NUMBER

| CHECK BIT EQ. NO. | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | C1 |  | 24 | 31 | 38 | 45 | 52 | 59 | 66 | 73 | 81 | 90 | 99 | 108 | 117 | 126 | 135 | 144 |  |
| 2 |  | C2 |  | 32 | 39 | 46 | 53 | 60 | 67 | 74 | 81 | 89 | 98 | 107 | 116 | 125 | 134 | 143 | 152 |
| 3 | 8 |  | C3 |  | 40 | 47 | 54 | 61 | 68 | 75 | 82 | 89 | 97 | 106 | 115 | 124 | 133 | 142 | 151 |
| 4 | 7 | 16 |  | C4 |  | 48 | 55 | 62 | 69 | 76 | 83 | 90 | 97 | 105 | 114 | 123 | 132 | 141 | 150 |
| 5 | 6 | 15 | 24 |  | C5 |  | 56 | 63 | 70 | 77 | 84 | 91 | 98 | 105 | 113 | 122 | 131 | 140 | 149 |
| 6 | 5 | 14 | 23 | 32 |  | C6 |  | 64 | 71 | 78 | 85 | 92 | 99 | 106 | 113 | 121 | 130 | 139 | 148 |
| 7 | 4 | 13 | 22 | 31 | 40 |  | C7 |  | 72 | 79 | 86 | 93 | 100 | 107 | 114 | 121 | 129 | 138 | 147 |
| 8 | 3 | 12 | 21 | 30 | 39 | 48 |  | C8 |  | 80 | 87 | 94 | 101 | 108 | 115 | 122 | 129 | 137 | 146 |
| 9 | 2 | 11 | 20 | 29 | 38 | 47 | 56 |  | C9 |  | 88 | 95 | 102 | 109 | 116 | 123 | 130 | 137 | 145 |
| 10 | 1 | 10 | 19 | 28 | 37 | 46 | 55 | 64 |  | C10 |  | 96 | 103 | 110 | 117 | 124 | 131 | 138 | 145 |
| 11 | 1 | 9 | 18 | 27 | 36 | 45 | 54 | 63 | 72 |  | C11 |  | 104 | 111 | 118 | 125 | 132 | 139 | 146 |
| 12 | 2 | 9 | 17 | 26 | 35 | 44 | 53 | 62 | 71 | 80 |  | C12 |  | 112 | 119 | 126 | 133 | 140 | 147 |
| 13 | 3 | 10 | 17 | 25 | 34 | 43 | 52 | 61 | 70 | 79 | 88 |  | C13 |  | 120 | 127 | 134 | 141 | 148 |
| 14 | 4 | 11 | 18 | 25 | 33 | 42 | 51 | 60 | 69 | 78 | 87 | 96 |  | C14 |  | 128 | 135 | 142 | 149 |
| 15 | 5 | 12 | 19 | 26 | 33 | 41 | 50 | 59 | 68 | 77 | 86 | 95 | 104 |  | C15 |  | 136 | 143 | 150 |
| 16 | 6 | 13 | 20 | 27 | 34 | 41 | 49 | 58 | 67 | 76 | 85 | 94 | 103 | 112 |  | C16 |  | 144 | 151 |
| 17 | 7 | 14 | 21 | 28 | 35 | 42 | 49 | 57 | 66 | 75 | 84 | 93 | 102 | 111 | 120 |  | C17 |  | 152 |
| 18 | 8 | 15 | 22 | 29 | 36 | 43 | 50 | 57 | 65 | 74 | 83 | 92 | 101 | 110 | 119 | 128 |  | C18 |  |
| 19 |  | 16 | 23 | 30 | 37 | 44 | 51 | 58 | 65 | 73 | 82 | 91 | 100 | 109 | 118 | 127 | 136 |  | C19 |

FIG. 3

| CHECK BIT EQ. NO. | \multicolumn{19}{c}{MEMORY MODULE NUMBER} |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| 1 | C1 | | | 28 | 34 | 40 | 46 | 52 | 57 | 62 | 68 | 75 | 82 | 90 | 98 | 106 | 114 | | |
| 2 | | C2 | | 35 | 41 | 47 | 53 | 58 | 63 | 68 | 74 | 81 | 89 | 97 | 105 | 113 | 121 | | |
| 3 | | | C3 | | 42 | 48 | 54 | 59 | 64 | 69 | 74 | 80 | 88 | 96 | 104 | 112 | 120 | 128 | |
| 4 | 7 | | | C4 | | 49 | 55 | 60 | 65 | 70 | 75 | 80 | 87 | 95 | 103 | 111 | 119 | 127 | |
| 5 | 6 | 14 | | | C5 | | X | 61 | 66 | 71 | 76 | 81 | 87 | 94 | 102 | 110 | 118 | 126 | |
| 6 | 5 | 13 | 21 | | | C6 | | X | 67 | 72 | 77 | 82 | 88 | 94 | 101 | 109 | 117 | 125 | |
| 7 | 4 | 12 | 20 | 28 | | | C7 | | X | 73 | 78 | 83 | 89 | 95 | 101 | 108 | 116 | 124 | |
| 8 | 3 | 11 | 19 | 27 | 35 | | | C8 | | X | 79 | 84 | 90 | 96 | 102 | 108 | 115 | 123 | |
| 9 | 2 | 10 | 18 | 26 | 34 | 42 | | | C9 | | X | 85 | 91 | 97 | 103 | 109 | 115 | 122 | |
| 10 | 1 | 9 | 17 | 25 | 33 | 41 | 49 | | | C10 | | 86 | 92 | 98 | 104 | 110 | 116 | 122 | |
| 11 | 1 | 8 | 16 | 24 | 32 | 40 | 48 | X | | | C11 | | 93 | 99 | 105 | 111 | 117 | 123 | |
| 12 | 2 | 8 | 15 | 23 | 31 | 39 | 47 | 55 | X | | | C12 | | 100 | 106 | 112 | 118 | 124 | |
| 13 | 3 | 9 | 15 | 22 | 30 | 38 | 46 | 54 | 61 | X | | | C13 | | 107 | 113 | 119 | 125 | |
| 14 | 4 | 10 | 16 | 22 | 29 | 37 | 45 | 53 | 60 | 67 | X | | | C14 | | 114 | 120 | 126 | |
| 15 | 5 | 11 | 17 | 23 | 29 | 36 | 44 | 52 | 59 | 66 | 73 | X | | | C15 | | 121 | 127 | |
| 16 | 6 | 12 | 18 | 24 | 30 | 36 | 43 | 51 | 58 | 65 | 72 | 79 | 86 | | | C16 | | 128 | |
| 17 | 7 | 13 | 19 | 25 | 31 | 37 | 43 | 50 | 57 | 64 | 71 | 78 | 85 | 93 | | | C17 | | |
| 18 | | 14 | 20 | 26 | 32 | 38 | 44 | 50 | 56 | 63 | 70 | 77 | 84 | 92 | 100 | | | C18 | |
| 19 | | | 21 | 27 | 33 | 39 | 45 | 51 | 56 | 62 | 69 | 76 | 83 | 91 | 99 | 107 | | | C19 |

| BIT POSITION | | | | | | | | | | | | | | | | | | | |
|---|---|---|---|---|---|---|---|---|---|---|---|---|---|---|---|---|---|---|---|
| 1 | 1 | 8 | 15 | 22 | 29 | 36 | 43 | 50 | 56 | 62 | 68 | 74 | 80 | 87 | 94 | 101 | 108 | 115 | 122 |
| 2 | 2 | 9 | 16 | 23 | 30 | 37 | 44 | 51 | 57 | 63 | 69 | 75 | 81 | 88 | 95 | 102 | 109 | 116 | 123 |
| 3 | 3 | 10 | 17 | 24 | 31 | 38 | 45 | 52 | 58 | 64 | 70 | 76 | 82 | 89 | 96 | 103 | 110 | 117 | 124 |
| 4 | 4 | 11 | 18 | 25 | 32 | 39 | 46 | 53 | 59 | 65 | 71 | 77 | 83 | 90 | 97 | 104 | 111 | 118 | 125 |
| 5 | 5 | 12 | 19 | 26 | 33 | 40 | 47 | 54 | 60 | 66 | 72 | 78 | 84 | 91 | 98 | 105 | 112 | 119 | 126 |
| 6 | 6 | 13 | 20 | 27 | 34 | 41 | 48 | 55 | 61 | 67 | 73 | 79 | 85 | 92 | 99 | 106 | 113 | 120 | 127 |
| 7 | 7 | 14 | 21 | 28 | 35 | 42 | 49 | X | X | X | X | X | 86 | 93 | 100 | 107 | 114 | 121 | 128 |
| 8 | C1 | C2 | C3 | C4 | C5 | C6 | C7 | C8 | C9 | C10 | C11 | C12 | C13 | C14 | C15 | C16 | C17 | C18 | C19 |

FIG. 4

| CHECK BIT EQ. NO. | 1 | 2 | 3 | 4 | 5 | 6 | 7 | 8 | 9 | 10 | 11 | 12 | 13 | 14 | 15 | 16 | 17 | 18 | 19 | 20 | OK | CE | UE |
|---|---|---|---|---|---|---|---|---|---|---|---|---|---|---|---|---|---|---|---|---|---|---|---|
| 1 | C1 | | | | | | | | | | | | | | | | | | | | 0 | 1 | 0 |
| 2 | | C2 | | | | | | | | | | | | | | | | | | | 0 | 1 | 1 |
| 3 | | | C3 | | | | | | | | | | | | | | | | | | 0 | 0 | 0 |
| 4 | | | | C4 | | | | | | | | | | | | | | | | | 0 | 0 | 1 |
| 5 | 1 | 5 | 9 | | 13 | 17 | 21 | 25 | | 30 | 35 | | 40 | 45 | | 49 | 53 | | 57 | | 0 | 0 | 0 |
| 6 | 2 | 6 | 7 | 10 | 14 | 18 | 22 | | 26 | 29 | 34 | 38 | 39 | 45 | | 50 | 54 | 58 | | 61 | 0 | 0 | 0 |
| 7 | 3 | 4 | 8 | 11 | 15 | 19 | 20 | | 27 | 31 | 33 | 37 | 42 | 44 | 46 | 50 | 55 | 59 | 63 | 62 | 0 | 0 | 0 |
| 8 | | 4 | | 12 | 16 | 17 | 22 | | 28 | 30 | | 37 | 41 | 43 | 47 | 49 | 54 | 60 | 64 | | 0 | 0 | 0 |
| 9 | | | | | | | | C7 | 26 | 31 | 34 | 38 | | | 48 | | 53 | 59 | 63 | | 0 | 0 | 0 |
| 10 | 3 | | 9 | | | | | | 27 | 32 | 35 | 36 | 42 | 43 | 46 | | 52 | | 56 | C15 | 0 | 0 | 0 |
| 11 | 2 | | 7 | | | | | C6 | 28 | | | | 41 | | | 51 | | | | | 0 | 0 | 0 |
| 12 | 1 | 6 | 8 | | | C5 | 21 | | 27 | 30 | C9 | | | C11 | C12 | C13 | | C14 | | 62 | 0 | 0 | 0 |
| 13 | | 5 | | | | 19 | 20 | 25 | 26 | 31 | 33 | C10 | 39 | 43 | 46 | 51 | | | 57 | 61 | 0 | 1 | 0 |
| 14 | | | | | | 18 | 22 | 23 | 28 | 32 | 35 | 36 | 40 | 44 | 47 | | 52 | | 56 | | 0 | 1 | 0 |
| 15 | | | | | | 17 | 21 | | | | | | | | 48 | | | | | C15 | 0 | 0 | 0 |

| BIT POSITION | 1 | 2 | 3 | 4 |
|---|---|---|---|---|
| 1 | 1 | 4 | 7 | 10 |
| 2 | 2 | 5 | 8 | 11 |
| 3 | 3 | 6 | 9 | 12 |
| 4 | C1 | C2 | C3 | C4 |

| BIT POSITION | 13 | 14 | 15 | 16 | 17 | 18 | 19 | 20 |
|---|---|---|---|---|---|---|---|---|
| 1 | 13 | 43 | 46 | 49 | 52 | 58 | 56 | 61 |
| 2 | 14 | 44 | 47 | 50 | 53 | 59 | 57 | 62 |
| 3 | 15 | 45 | 48 | 51 | 54 | 60 | 63 | X |
| 4 | 16 | C11 | C12 | C13 | 55 | C14 | 64 | C15 |

FIG. 6

| CHECK BIT EQ. NO. | \multicolumn{11}{c}{COLUMN} |
| --- | --- | --- | --- | --- | --- | --- | --- | --- | --- | --- | --- |
|  | 1 | 2 | 3 | 4 | 5 | 6 | 7 | 8 | 9 | 10 | 11 |
| 1 | C1 |  |  | 32 | 31 | 30 | 29 | 28 |  |  |  |
| 2 |  | C2 |  |  | 18 | 16 | 29 | 12 | 10 |  |  |
| 3 |  |  | C3 |  | 15 | 14 | 12 | 9 | 8 |  |  |
| 4 | 27 |  |  | C4 |  | 13 | 28 | 9 | 7 | 6 |  |
| 5 | 26 | 25 |  |  | C5 |  | 11 | 10 | 7 | 5 |  |
| 6 | 26 | 24 | 23 |  |  | C6 |  |  | 8 | 5 |  |
| 7 | 27 | 24 | 22 | 32 |  |  | C7 |  |  |  | 6 |
| 8 |  | 25 | 21 | 20 | 18 |  |  | C8 |  |  |  |
| 9 |  |  | 21 | 19 | 31 | 15 |  |  | C9 |  |  |
| 10 |  |  | 22 | 19 | 17 | 16 | 13 |  |  | C10 |  |
| 11 |  |  | 23 | 20 | 17 | 30 | 14 | 11 |  |  | C11 |

FIG. 6A
(PRIOR ART)

| CHECK EQUATIONS | \multicolumn{11}{c}{MODULES} |
| --- | --- | --- | --- | --- | --- | --- | --- | --- | --- | --- | --- |
|  | 1 | 2 | 3 | 4 | 5 | 6 | 7 | 8 | 9 | 10 | 11 |
| 1 | C1 | 0 | D12 | D15 | D18 | D21 | D25 | D30 | D35 | D40 | 0 |
| 2 | 0 | C2 | 0 | D16 | D19 | D22 | D25 | D29 | D34 | D39 | D44 |
| 3 | D4 | 0 | C3 | 0 | D20 | D23 | D26 | D29 | D33 | D38 | D43 |
| 4 | D3 | D8 | 0 | C4 | 0 | D24 | D27 | D30 | D33 | D37 | D42 |
| 5 | D2 | D7 | D12 | 0 | C5 | 0 | D28 | D31 | D34 | D37 | D41 |
| 6 | D1 | D6 | D11 | D16 | 0 | C6 | 0 | D32 | D35 | D38 | D41 |
| 7 | D1 | D5 | D10 | D15 | D20 | 0 | C7 | 0 | D36 | D39 | D42 |
| 8 | D2 | D5 | D9 | D14 | D19 | D24 | 0 | C8 | 0 | D40 | D43 |
| 9 | D3 | D6 | D9 | D13 | D18 | D23 | D28 | 0 | C9 | 0 | D44 |
| 10 | D4 | D7 | D10 | D13 | D17 | D22 | D27 | D32 | 0 | C10 | 0 |
| 11 | 0 | D8 | D11 | D14 | D17 | D21 | D26 | D31 | D36 | 0 | C11 |

FIG. 6B

MODULES

CHECK EQUATIONS

| | 1 | 2 | 3 | 4 | 5 | 6 | 7 | 8 | 9 | 10 | 11 |
|---|---|---|---|---|---|---|---|---|---|---|---|
| 1 | C1 | 0 | 0 | D12 | D14 | D16 | D19 | D23 | D27 | 0 | 0 |
| 2 | 0 | C2 | 0 | 0 | D15 | D17 | D19 | D22 | D26 | D30 | 0 |
| 3 | 0 | 0 | C3 | 0 | 0 | D18 | D20 | D22 | D25 | D29 | D33 |
| 4 | D3 | 0 | 0 | C4 | 0 | 0 | D21 | D23 | D25 | D28 | D32 |
| 5 | D2 | D6 | 0 | 0 | C5 | 0 | 0 | D24 | D26 | D28 | D31 |
| 6 | D1 | D5 | D9 | 0 | 0 | C6 | 0 | 0 | D27 | D29 | D31 |
| 7 | D1 | D4 | D8 | D12 | 0 | 0 | C7 | 0 | 0 | D30 | D32 |
| 8 | D2 | D4 | D7 | D11 | D15 | 0 | 0 | C8 | 0 | 0 | D33 |
| 9 | D3 | D5 | D7 | D10 | D14 | D18 | 0 | 0 | C9 | 0 | 0 |
| 10 | 0 | D6 | D8 | D10 | D13 | D17 | D21 | 0 | 0 | C10 | 0 |
| 11 | 0 | 0 | D9 | D11 | D13 | D16 | D20 | D24 | 0 | 0 | C11 |

FIG. 6C

MODULES

CHECK EQUATIONS

| | 1 | 2 | 3 | 4 | 5 | 6 | 7 | 8 | 9 | 10 | 11 |
|---|---|---|---|---|---|---|---|---|---|---|---|
|   | C1 | 0 | 0 | 0 | 0 | 0 | 0 | 0 | 0 | 0 | 0 |
| 1 | 0 | C2 | 0 | D12 | D14 | D16 | 0 | D22 | D26 | D30 | 0 |
| 2 | 0 | 0 | C3 | 0 | D15 | D17 | D19 | D22 | D25 | D29 | D33 |
| 3 | D3 | 0 | 0 | C4 | 0 | D18 | D20 | 0 | D25 | D28 | D32 |
| 4 | D2 | D6 | 0 | 0 | C5 | 0 | D21 | D23 | D26 | D28 | D31 |
| 5 | D1 | D5 | D9 | D12 | 0 | C6 | 0 | D24 | 0 | D29 | D31 |
| 6 | D1 | D4 | D8 | 0 | D15 | 0 | C7 | 0 | D27 | D30 | D32 |
| 7 | D2 | D4 | D7 | D11 | D14 | D18 | 0 | C8 | 0 | 0 | D33 |
| 8 | D3 | D5 | D7 | D10 | 0 | D17 | D21 | 0 | C9 | 0 | 0 |
| 9 | 0 | D6 | D8 | D10 | D13 | D16 | D20 | D24 | 0 | C10 | 0 |
| 10 | 0 | 0 | D9 | D11 | D13 | 0 | D19 | D23 | D27 | 0 | C11 |

$C1 \equiv 0$

FIG. 8

CHECK EQUATIONS

| | 1 | 2 | 3 | 4 | 5 | 6 | 7 | 8 | 9 | 10 | 11 |
|---|---|---|---|---|---|---|---|---|---|---|---|
| 1 | C1 | 0 | 0 | A31 | A30 | A29 | A28 | A27 | A26 | 0 | 0 |
| 2 | 0 | C2 | 0 | 0 | A25 | A24 | A28 | A23 | A22 | A21 | 0 |
| 3 | 0 | 0 | C3 | 0 | 0 | A20 | A19 | A23 | A18 | A17 | A16 |
| 4 | A11 | 0 | 0 | C4 | 0 | 0 | A15 | A27 | A18 | A14 | A13 |
| 5 | A10 | A8 | 0 | 0 | C5 | 0 | 0 | A12 | A22 | A14 | 0 |
| 6 | A9 | A7 | A5 | 0 | 0 | C6 | 0 | 0 | A26 | A17 | 0 |
| 7 | A9 | A6 | A4 | A31 | 0 | 0 | C7 | 0 | 0 | A21 | A13 |
| 8 | A10 | A6 | A3 | A2 | A25 | 0 | 0 | C8 | 0 | 0 | A16 |
| 9 | A11 | A7 | A3 | A1 | A30 | A20 | 0 | 0 | C9 | 0 | 0 |
| 10 | 0 | A8 | A4 | A1 | A0 | A24 | A15 | 0 | 0 | C10 | 0 |
| 11 | 0 | 0 | A5 | A2 | A0 | A29 | A19 | A12 | 0 | 0 | C11 |

FIG. 14

|  | #ELs = 1 | | |
|---|---|---|---|
| | 0 | =1 | >1 |
| #Ss=1  0 | NO ERRORS CORRECT DATA | CANNOT OCCUR | |
| =1 | SINGLE CHECK BIT OR ONE CHECK BIT AND ONE DATA BIT IN ERROR DATA MAY BE CORRECT | CANNOT OCCUR | |
| >1 | MULTIPLE MODULE ERRORS NOT CORRECTABLE | SINGLE MODULE ERRORS CORRECTABLE ERRORS | |

THESE ARE ELIMINATED WHEN THE ELs ARE ANDED WITH THE INCLUSIVE OR OF THE Ss

ERROR DETECTION AND CORRECTION SYSTEM FOR USE WITH ADDRESS TRANSLATION MEMORY CONTROLLER

FIELD OF THE INVENTION

The present invention relates to error detection and correction codes for use in detecting and correcting block errors.

BACKGROUND OF THE INVENTION

Errors are generated in digital systems from a variety of sources. Noise or individual connections can cause errors on any individual data bit, control line, or address bit. Many codes have been devised for detecting and correcting single and multiple bit errors.

Certain types of failures cause multiple bit errors occurring in a group, i.e., adjacent bit errors. A typical example is a chip failure, in which all of the bits handled by the chip are in error. For example, in a memory using memory chips organized as "by 4", or "by 8" (4 bits per address or 8 bits per address), a single chip failure results in up to 4 (or 8) adjacent bits being in error. As another example, a 64 bit address bus may by driven by bus drivers organized with 4 drivers on one chip, or 16 driver chips. One bus driver chip failure causes up to 4 adjacent address bits to be in error. A similar group of adjacent errors occur if the power supply connection to an otherwise good chip fails or becomes intermittent.

As memory arrays become larger using larger data word lengths in larger addressed memory space, the reliability of large arrays declines because there are more memory chips and address bits to fail. In critical missions, such as low orbit communications satellites, the probability of performing for the life of the satellite without an error becomes unacceptably low.

Thus, it is particularly important in an error detection and correction system to detect and/or correct errors caused by chip (module) failures. In particular, it is desired to detect and correct 100% of all single component failures, and detect and identify all or most all double component failures.

In addition, it is also desired to protect address and control line signals as well as data. However, address and control lines require near real time error detection and correction in order not to slow down the system.

In U.S. Pat. No. 3,562,709 to Srinivasan, an error correction scheme is disclosed for detecting 100% of all single module failures. In Srinivasan, the information bits are divided into subsets with the following properties: 1) a particular information bit appears only once in a subset, 2) each information bit appears in exactly two different subsets, 3) no two subsets of information bits have more than one particular bit in common, and 4) the number of subsets must be a prime number. The subsets are arrayed in an error code matrix used for check bit generation and error detection and correction.

Each module contains a check bit. The check bit is generated in each subset as a parity bit by the exclusive OR (modulo 2 sum) of all information bits in the subset. The information data bits and the check bits are then transmitted from a source to a destination such as from the memory to the central processor, or back. At the destination, the data is checked by generating syndrome bits in an exclusive OR logic array, and checking for characteristic patterns. A bit within a module is in error if the two subsets containing that bit both indicate a parity error. Furthermore, any other bits from the same module which are also in error will cause a different pair of subsets to indicate a parity error in both subsets. Since each bit within a module contains unique and separate pairs of subsets, all errors occurring solely within a single module can be corrected.

However, Srinivasan specifically limited the number of check bits equal to a prime number in order to be able to generate the matrix in an orderly manner by cyclically shifting and rotating bits in a vertical direction. Furthermore, Srinivasan required the use of one check bit per module. As a result, in Srinivasan, the number of check bits must be equal to the number of modules which must be equal to a prime number.

However, due to the constraints by which Srinivasan constructs his error code matrix, some double module errors appear as correct data, a condition which should never be allowed to occur. Furthermore, due to the dimensional limitations imposed by Srinivasan as necessary conditions for constructing the error code matrix, the module size is not a power of two, thus making an error detection and correction system more expensive to construct from custom parts, or resulted in wasted capacity or more circuit connections if constructed from commercially available parts. These constraints limited the range of useful codes and was wasteful of memory. That is, for useful word lengths, Srinivasan did not provide for full utilization of memory.

SUMMARY OF THE INVENTION

The present invention is embodied in an error detection and correction (EDAC) system in which the numerical constraints imposed by Srinivasan are overcome. The unique EDAC of the present invention corrects all single component errors and detects all double component errors, some of which double component errors are detected as single component errors. That is, no double component error looks like correct data. In particular, new classes of error codes are formed by providing an error code matrix having a number of subsets not equal to a prime number.

A second new class of error codes are formed by providing a nonsymmetrical error code matrix having a number of subsets not equal to the number of modules. The constraints of having each information bit appearing in exactly two different subsets, and no two subsets of information bits have more than one particular bit in common, is still met, but the number of check bits is less than the number of modules. Even so, all single module errors are corrected. In such manner, in some cases more efficient EDAC codes are generated with fewer check bits for a given number of information bits. Furthermore, improved performance in detecting double module errors is obtained by distributing the fewer check bits more evenly throughout the error code matrix. In this second class of error codes, the number of check bits for a given number of data bits will be the same if the number of check bits is prime number.

Further, yet another new class of error codes are formed by providing unused bits in some modules and distributing such unused bits more or less evenly throughout the error code matrix. The above constraints of having each information bit appearing in exactly two different subsets, and no two subsets of information bits have more than one particular bit in common, is still met, but yet improved performance in detecting double module errors is effected by use of the unused bits.

In another aspect of the present invention, for memory systems including virtual memory addressing, a memory address translation unit further incorporates a partial implementation of the EDAC encoding. In a virtual memory system, memory management is typically achieved by the use of a memory address translation unit. The operating system of the central processor loads the memory address translation unit during the loading of an application program in order to translate the application program generated virtual addresses into actual memory system physical hardware addresses. The higher order virtual address bits are the input to the memory address translation unit with the higher order physical address bits being its output. The lower order address bits from the virtual address are used unmodified and are the lower order address bits of the physical address. The EDAC encoding is integrated into the memory address translation unit so that both the virtual address translation and the EDAC encoding are carried out in one process, thus saving cost and improving speed.

In yet another aspect of the present invention, unused data bits are used as parity bits to reduce the number of error combinations in which double module errors appear as single module errors. One unused data bit is used as a parity bit over all the data bits. The use of a parity bit over the data is used to distinguish such cases as the case of two check bits being in error indicating a correctable error occurring in a single data bit in a third module.

If a second unused data bit is available, such as in the case of a 128 bit, 19 by 19 matrix, an independent parity bit on the check bits is used. The additional parity bit over the check bits is used to distinguish the case of a data bit error and a check bit error (in different groups) appearing as a single module, correctable error. In the later case, both parity bits (a first parity bit over the data and a second parity bit over the check bits) indicate an error.

Finally, the present invention is embodied in an EDAC system in which a false indication of error is avoided by ANDing each of the error logic (EL) signals which indicate the location of an error, with an inclusive OR of all the syndrome bits (Ss) which indicate the existence of an error but not the location of the error. In such manner, the ELs are set to zero when the Ss bits indicate that there are no errors.

BRIEF DESCRIPTION OF THE FIGURES

FIG. 2 is an error code generation matrix or table showing the composition of check bit equations for an EDAC code for a 152 bit wide memory system having 19 modules, using the prior art Srinivasan method of error detection and correction.

FIG. 3 is an error code generation matrix or table showing the composition of check bit equations for an EDAC code, and the grouping of bits into physical modules of a 128 bit wide memory system having 19 modules, in accordance with the present invention.

FIG. 4 is an error code generation matrix or table showing the composition of check bit equations for an EDAC code and the grouping of bits into physical modules for a 64 bit wide memory system having 20 modules using a method according to the present invention. The matrix or table of FIG. 4 also shows the syndromes that result from several different cases of error detection and correction.

FIG. 6 is an error code generation matrix or table showing the composition of the check bit equations for an EDAC code for a 32 bit address.

FIG. 6A is an error code generation matrix or table showing the composition of check bit equations for an EDAC code for a 44 bit wide memory system having 11 modules and eleven check bits, using the prior art Srinivasan method of error detection and correction.

FIG. 6B is a modified error code generation matrix or table showing the composition of check bit equations for an EDAC code for a 33 bit wide memory system having 11 modules and eleven check bits, in accordance with the present invention.

FIG. 6C is a modified error code generation matrix or table showing the composition of check bit equations for an EDAC code for a 33 bit wide memory system having 11 modules and 10 check bits, in accordance with the present invention. The check bit C1 will always be zero since all of the data bits in the equation are zero as shown in the top row of the matrix of FIG. 6C.

FIG. 8 is an alternate embodiment for an error code generation matrix or table showing the composition of the check bit equations for an EDAC code used in the system of FIG. 9.

FIG. 14 illustrates in summary form, the relationship between the number of syndrome bits equal to a logic one, and the numbers of error logic signals equal to a logic one.

DETAILED DESCRIPTION

Whole System Overview

Figure 1:
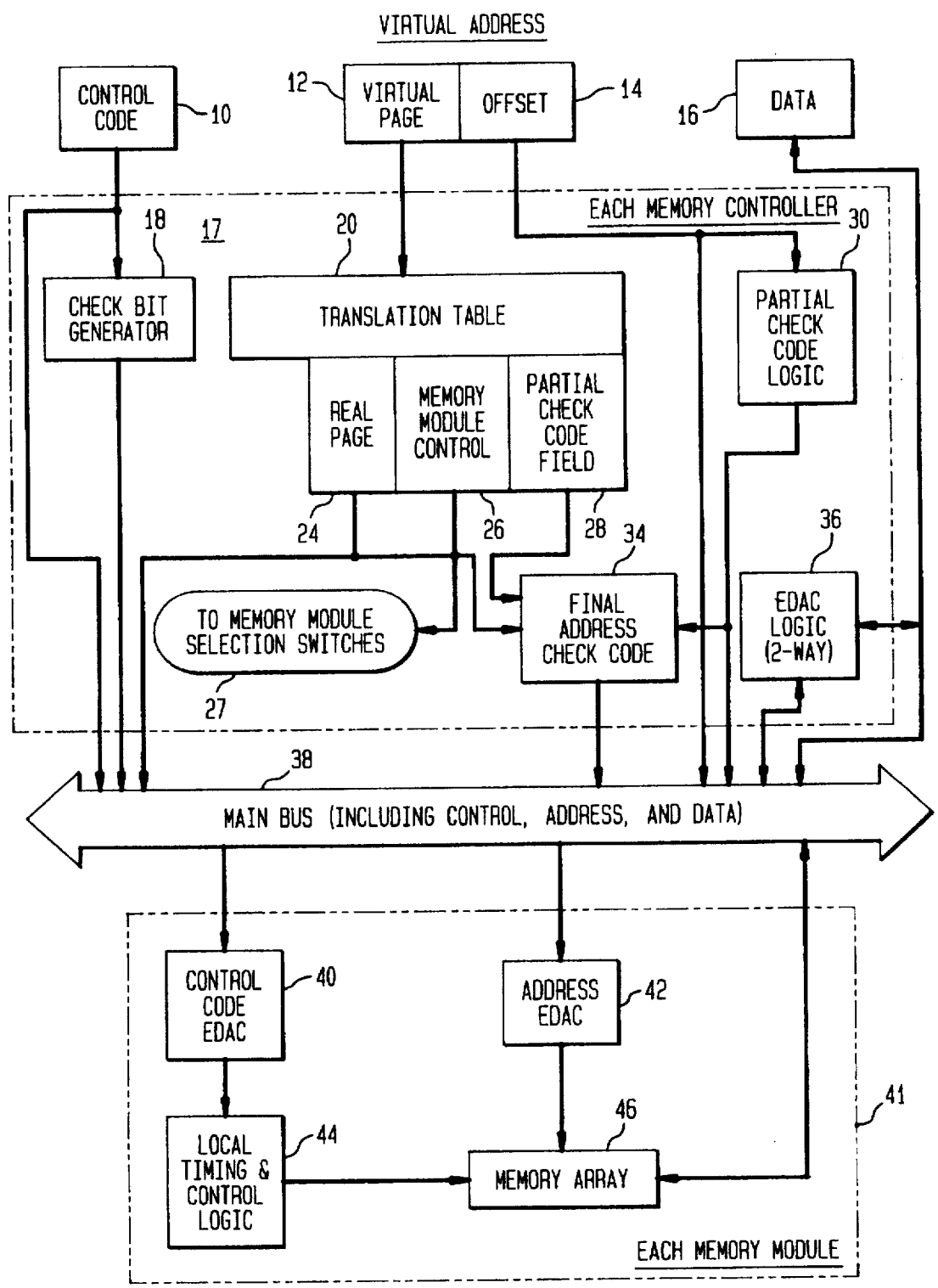
FIG. 1 is a block diagram of a computer memory system in accordance with the present invention.

The overall construction of a memory system built according to the method of the present invention is shown in FIG. 1. A processor (not shown) generates a virtual address composed of upper order bits designating a virtual page 12 and lower order bits designating an offset 14 that points to a particular word within a page. The processor also generates a control code 10 that commands the memory system to perform an operation, such as to read or write a word or portion of a word. In addition, the processor generates data 16 that is to be written into the memory system or receives data that is read from the memory system.

The memory operation commanded by the processor is effected by a memory controller 17 composed of a translation table 20, a check bit generator 18 for control code 10, partial check code logic 30 for the offset 14 of the address, final address check code logic 34, and two way error detection and correction (EDAC) logic 36 for data to and from the memory. The translation table 20 in the memory controller contains a record for each virtual page that is loaded into real (physical) memory. Each record contains the virtual page designator 22, the corresponding real page designator 24, the memory module control bits 26 needed to activate the correct memory module selection switch 27, and bits resulting from a previously loaded partial computation of the address check code field 28.

The memory controller 17 acts through the main bus 38 of the system to control multiple memory modules. Each memory module 41 is composed of a memory array 46, local timing and control logic 44, EDAC logic 40 for control codes, and EDAC logic 42 for addresses. The system may contain multiple memory controllers that arbitrate to gain use of the multiple memory modules, and each memory controller may be dedicated to a single processor or one or more processors may share one or more memory controllers.

In operation, each of data, address and control signals are protected in real time by the EDAC logic system in accordance with the present invention. The check bit generator 18 adds check bits to the control code 10 and places the result on main bus 38. EDAC logic 36 computes check bits to be included with the data on the main bus 38. Address check bits are computed in two parts: virtual and offset. Check bits for the offset portion of the virtual address are computed by partial code check logic 30. Check bits for the virtual page portion of the virtual address are combined with the function of the address translation table, represented by partial check code field 28. The error protected address, (virtual page and offset) and the check bits for the address is placed on the main bus 38.

At the memory module 41, the received control code is processed to check for any transmission errors in a control code EDAC circuit. The checked and/or corrected control code is provided to the timing and control logic 44. Similarly, the received address from the main bus 38 is processed in an address EDAC circuit. The checked and/or corrected address is applied to memory array 46. Received data and corresponding EDAC bits is stored together with its EDAC bits in memory array 46. It is also feasible to combine the control signals and the address bits into one number space and implement an EDAC by a single error code.

During a memory read operation, the EDAC encoding and decoding of address and control signals is the same as for a memory store operation above. However, for a read operation, the data received from the memory array 46 is applied to the two way EDAC logic 36. In such manner, the integrity of the stored data is checked. That is, what was previously stored in the memory should be the same as what is now received from the memory. Errors in transmission or storage are detected and corrected if necessary, by the EDAC system.

ERROR DETECTION AND CORRECTION OF ADDRESS BITS

Typically in the prior art, the address translation table and EDAC encoding is performed in series. First a physical, real, address is generated from the virtual address, then the check bits are generated for the physical address which is the placed on the address bus. Having two processes occur in series, increases the length of the memory cycle which in turn reduces the maximum transfer rate between the memory array 46 and the central processor.

In the pre sent invention, the EDAC logic and the virtual address translation are integrated into the same operation. During system initialization, when the operating system is setting various system parameters in accordance the system hardware configuration, one of the initialization steps is to load the translation table memory 20 of the virtual memory controller 17. In the present invention, the operating system pre-computes some of the EDAC bits needed for the physical address bits, in effect, reducing delay time during computer operation.

The physical address bits have two component parts (physical page and offset) that need to be encoded whether separately or together to provide the error control desired. If the EDAC process is performed on the address in two separate pieces, the bits stored in the address translation table would require separate check bits just for the bits of the physical page address, and the bits of the offset address would require separate check bits just for the offset address. Both encoding processes of the address would take place in parallel.

In the preferred embodiment shown in FIG. 1 (and in further detail in FIGS. 7 and 9), the physical page address and the offset address are encoded together with common check bits over the entire physical address. The operating system pre-computes a partial error check code field 28 to be stored in the address translation table 20, as a first stage. At the same time, another first stage partial error check code operation is performed in hardware, in the partial error check code logic 30. The two first stage partial error check code results are combined in a second stage partial error check encoder, to compute the final physical address check code 34. By pre-computing a partial error check code field in the address translation table, the final address check code generation 34 requires only one gate level delay (as further illustrated in FIGS. 7 and 9). In such manner, the address EDAC encoding delay time is being hidden and performed in parallel with the virtual page address translation delay time. As a result of sharing the virtual page address translation delay time with partial EDAC encoding, the advantages of having EDAC coding on the address lines is obtained without the speed penalty normally associated with adding EDAC capability.

EDAC Principles

The primary purpose of error detection and correction (EDAC) in the present invention is to detect and correct any number of bit errors contained within a single module (called single module error). A secondary purpose of the EDAC in the present invention is to detect, but not correct, a collection of bit errors that occur in more than a single memory module (called a multiple module error).

The EDAC process can be described by a set of equations. Each bit of a check code is computed by an equation giving the exclusive OR (or modulo 2 sum) of a subset of the data bits to be protected. Each bit of a syndrome code, which indicates the type and possibly the exact location of errors, is computed by an equation giving the exclusive OR (or modulo 2 sum) of a subset of both data and check code bits

THE METHOD OF SRINIVASAN

FIG. 2 is a matrix or table of the EDAC equations for an example of the method of Srinivasan, which is the closest prior art to the present invention. This example protects data in a memory system composed of 19 physically separate 9 bit wide memory modules arranged in parallel to get a memory system with a 152 bit wide data word plus 19 check bits for a total data path width of 171 bits. The entries in the table beginning with 'C' indicate check bits and the numbers are numerical designators of the 152 data bits.

Figure 5:
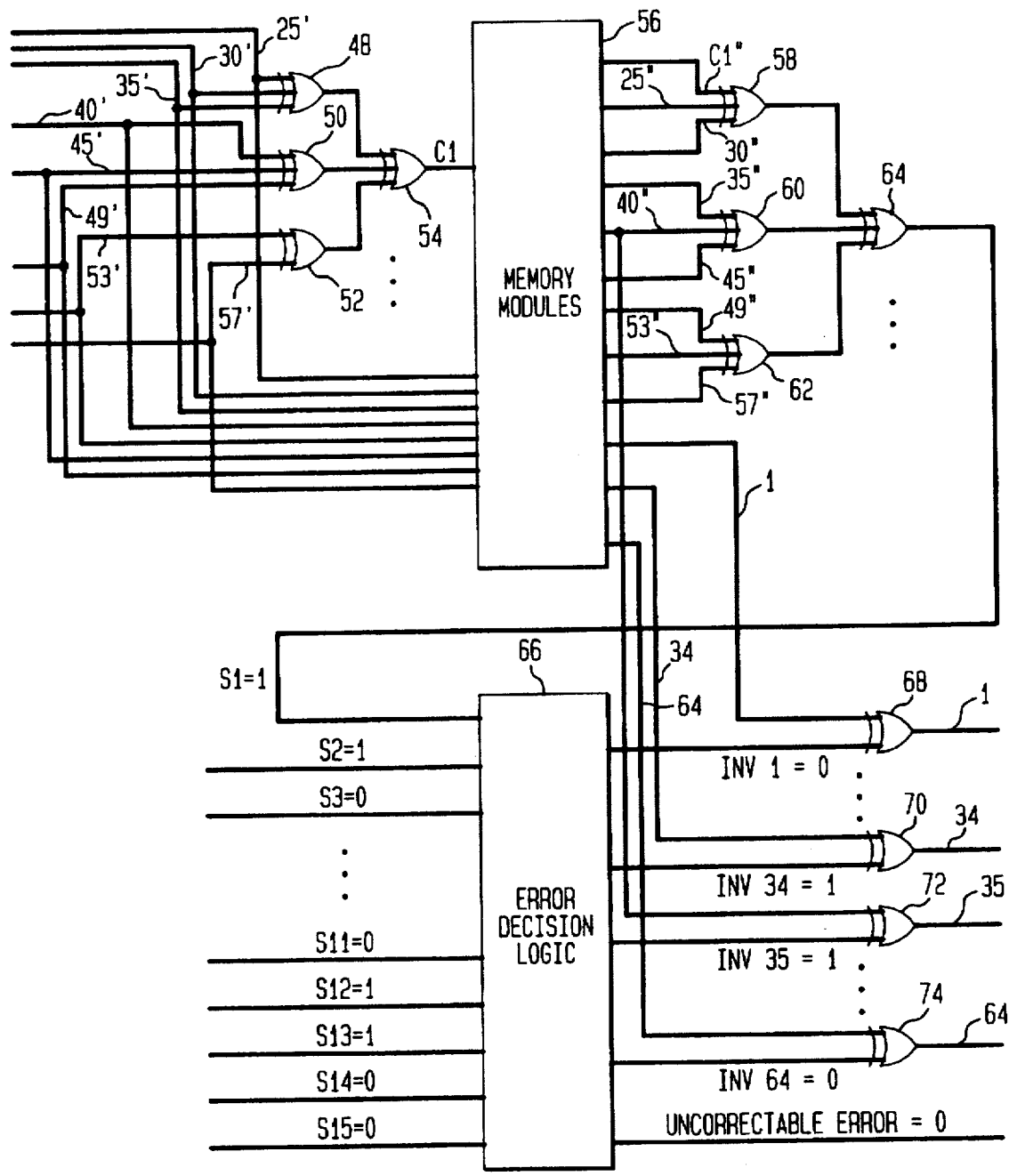
FIG. 5 is a logic diagram illustrating the logic circuit derived from the first line of FIG. 4, in the check bit generation table, for use in an error detection and correction in accordance with the present invention.

Each row of the table is associated with a check bit equation and a corresponding syndrome bit equation. The check bit equation defines the single check bit in that row as the exclusive OR combination of all the data bits in the row at the time when they are stored, and the corresponding syndrome equation defines the syndrome bit as the exclusive OR combination of all of the data bits in the row at the time when they are retrieved with the check bit for that row. For example, the check bit equation associated with the first row is:

$$C1=D24'\oplus D31'\oplus D38'\oplus D45'\oplus D52'\oplus D59'\oplus D66'\oplus D73'\oplus D81'\oplus D90'\oplus D99'\oplus D108'\oplus D117'\oplus D126'\oplus D135'\oplus D144' \quad [EQ1]$$

where D indicates a data bit and $\oplus$ is a symbol for exclusive OR (the quotes exist only to match designators in FIG. 5). The associated syndrome bit equation is:

$$C1=D24"\oplus D31"\oplus D38"\oplus D45"\oplus D52"\oplus D59"\oplus D66"\oplus D73"\oplus D81"\oplus D90"\oplus D99"\oplus D108"\oplus D117"\oplus D126"\oplus D135"\oplus D144" \quad [EQ2]$$

where S indicates a syndrome bit and the double quotes indicate the retrieved value of the bits, as opposed to the values written (which may or may not be equal).

Each column of the table is associated with a physical 9 bit wide memory module. The eight data bits and one check bit indicated in each column are the nine bits that are stored in the physical module associated with that column.

A table, such as FIG. 2, showing EDAC equations for the Srinivasan method is composed according to the following additional rules:

I. The number k of rows and columns must be the same prime number. (k=19 in FIG. 2.)
II. One column (for example, column 10 in FIG. 2) is defined with its check bit at the center position and two entries of each data bit in symmetrical positions above and below the check bit. There will remain two null entries arranged in symmetrical positions above and below the check bit.
III. Each of the other k-1 columns of the table has its eight data bits and one check bit arranged in positions that are a cyclical permutation of the arrangement in the first column formed. (For example: Start with column 10 in FIG. 2.

Reduce the check bit designator by one and all data bit designators by eight to get the bits to be placed in column 9.

Shift every bit up by one position, wrapping the bit in the top position around to the bottom position. The result is column 9 of FIG. 2. Column 8 is formed similarly from column 9, etc. Columns above 10 are formed in like manner but with down shifts instead of up shifts.)

Any combination of errors in the data bits and check bits of a single column are analyzed (and corrected) by examining the syndrome bits computed from the rows of the table in the manner of Equation 2. For the example of FIG. 2, there is a syndrome S1, S2, S3, S4, S5, S6, S7, S8, S9, S10, S11, S12, S13, S14, S15, S16, S17, S18 and S19. When this syndrome is a string of all zeros, there are no errors. When one or more of the bits are one, the particular pattern of the syndrome will determine whether there is a correctable single module error or an uncorrectable multiple module error.

The rules used to form the table of check bit equations result in the following important property: each data bit appears in exactly two different rows, and no two data bits appear in the same two rows. Because of this, each possible single bit error will generate a unique 2-of-k code in the syndrome. (For example, if data bit 81 is bad in the example of FIG. 2, then the syndrome=1100000000000000000.) Each data bit is corrected by inverting its retrieved value if the 1 bits of its unique 2-of-k code are seen in the computed syndrome, provided that examination of the whole syndrome does not determine that there is an uncorrectable multiple module error. (For example, retrieved data bit 81 in the example of FIG. 2 is inverted if S1*S2=1, where * is the logical AND operation.)

The examination of the syndrome to decide between single module errors and multiple module errors can be implemented by a table of single bit entries indexed by all possible syndromes ($2^{19}$ bits in the example of FIG. 2) with a zero entry for single module errors and a one entry for multiple module errors. For example, if all of the bits in the first module were bad in the example of FIG. 2, the syndrome would be 0011111111111111110 and the corresponding entry would be zero for single module errors, but if bits 8 and 16 were bad, the syndrome would be 0011000000000000011 and the corresponding entry would be one for multiple module error. Note that it is possible for an actual multiple module error to be incorrectly detected as an single module error (for example, if bits 81 and 65 are bad in the example of FIG. 2, the syndrome will be 1100000000000000011, and this is the same syndrome generated when bits 73 and 74 are bad in the same module 10.) However, these cases are a small percentage of the possible multiple module errors and multiple module errors are rare compared to single module errors.

Note that not all check equations are involved when there are bits in a block which are in error (where there are zeros in the column and where the check bit is in the column). To locate an error, both check equations containing a particular bit will indicate an error if the bit is in error. The same will be true of all pairs of check equations corresponding to the other bits in the same block as the particular example bit. It is also true, that none of the check equations where there are no bits of the example block, will indicate an error. (If they do then a multiple block error conditions has occurred). It is possible, but of little consequence, if the check equation containing the check bit that is in the example block indicates an error in the check bit.

Syndrome bit logic to indicate an error condition for columns 11 and 12 in FIG. 2 are as follows:

| For column 11 errors: | For column 12 errors: |
| --- | --- |
| S1 = S2 and | S1 = S4 and |
| S3 = S19 and | S2 = S3 and |
| S4 = S18 and | S5 = S19 and |
| S5 = S17 and | S6 = S18 and |
| S6 = S16 and | S7 = S17 and |
| S7 = S15 and | S8 = S16 and |
| S8 = S14 and | S9 = S15 and |
| S9 = S13 and | S10 = 514 and |
| S10 = 0 and | S11 = 0 and |
| S12 = 0 and | S13 = 0 and |
| S11 = either 1 or 0 | S12 = either 1 or 0 |

3. THE NEW METHOD FOR 8 BIT WIDE MODULES

Since the implementation of 9 bit wide memory modules is generally more expensive than the implementation of 8 bit wide modules, because of more standard 8 bit wide components, a modification and improvement is desirable to the Srinivasan method described above. A table of check bit equations according to such an improved method is given in FIG. 3. This table is formed from a Srinivasan table, like the one shown in FIG. 2, by using one less data bit in each column (corresponding to a module), leaving two additional null positions per column. This leaves 152–19= 133 data bits. Since standard processors require memory widths of 2, 4, 8, or 16 bytes of 8 bits each, the number of bits is further reduced to 128 by removing an additional data bits from each of columns 8 through 12 (shown with X's in the table), leaving 128 bits (16 bytes) of data. These five removed bits actually correspond to five unused bits in memory because all physical modules are identical 8 bit wide units. The arrangement of bits in the physical modules is shown at the bottom of FIG. 3.

While this improved method is less efficient in that the ratio of the number of non data bits (check bits and unused bits) to the number of data bits is higher than the Srinivasan method, this is more than compensated by the improved economy of standard components. Furthermore, additional null entries in the table mean that fewer of the possible $2^{19}$ syndrome codes represent correctable single module errors. This means that the probability that a multiple module error will be mistaken for a single module error (a very serious failure) will be even lower than in the corresponding Srinivasan example. (Simulation shows that this last effect of the improved method is strengthened when data bits are removed evenly across the columns, that is, one bit is removed from each column before a second bit is removed from any column, a second bit from each column before a third bit is removed from any column and so on. Some simulation data also indicates that performance is slightly improved by spreading the columns with one fewer bit as far apart as possible, not grouped together as in FIG. 3.)

THE NEW METHOD FOR 4 BIT WIDE MODULES

Four bit wide memory components are also quite standard, and sometimes more economical than 8 bit wide components, it is desirable to have a method for error detection and correction for 4 bit wide memory modules. Such a method is defined by the first 20 columns of the table in FIG. 4. This arrangement has twenty 4 bit wide modules containing 15 check bits, 64 data bits, and one unused bit. The arrangement of the bits in the physical modules is shown at the bottom of FIG. 4.

This new EDAC method is a radical departure from prior art because:
1. The number of rows and columns is not equal and neither is a prime number.
2. The columns are not cyclical permutations of one another.

The significant property of the check bit equation tables are: each data bit appears in exactly two different rows, and no two data bits appear in the same two rows. Thus there is a 2-of-k (2-of-15 in this case) syndrome code generated for each single bit error, as before. Furthermore, the single module error case can still be distinguished from the multiple module error case by the syndrome calculation.

Syndrome bit logic to indicate an error condition for columns 10 and 11 in FIG. 4 are as follows:

| For column 10 errors: | For column 11 errors: |
| --- | --- |
| S1 = S11 and | S1 = S13 and |
| S2 = S10 and | S2 = S12 and |
| S12 = S15 and | S3 = S11 and |
| S13 = S14 and | S4 = 0 and |
| S3 = 0 and | S5 = 0 and |
| S4 = 0 and | S6 = 0 and |
| S5 = 0 and | S7 = 0 and |
| S6 = 0 and | S8 = 0 and |
| S7 = 0 and | S10 = 0 and |
| S8 = 0 and | S14 = 0 and |
| S9 = 0 | S15 = 0 and |
|  | S9 = either 1 or 0 |

FIG. 5 shows a logical circuit implementation of the table of FIG. 4. The small numbers with single quote marks represent data bits to be stored. The small numbers with double quote marks are retrieved data bits. Exclusive OR gates 48, 50, 52, and 54 compute the first check bit C1.

Similar circuits exist for all other check bits. The check bits and data bits are stored in the memory modules 56. Exclusive OR gates 58, 60, 62, and 64 compute the syndrome bit S1 from the retrieved data and check bits. Similar circuits exist for all other syndrome bits.

The 15 bits of the syndrome are input to an error decision logic array 66 that contains an error decision logic. This logic decodes the 2-of-15 codes that indicate bit inversions in the output data implemented by 64 exclusive OR gates, of which four (68, 70, 72, and 74) are shown in FIG. 5.

The output of error decision logic 66 shown in FIG. 5 illustrates a correctable single module error case corresponding to syndrome column CE of FIG. 4. The total syndrome does not indicate a uncorrectable error, and the one's in the syndrome indicate inversion (correction) of bits 34 and 35. If the circuits of FIG. 5 were to generate the syndrome of column OK of FIG. 4, there would be no errors and no bit inversions. If the circuits of FIG. 5 were to generate the syndrome of column UE of FIG. 4, there would be an uncorrectable error indicated and none of the output data could be trusted.

Figure 10:
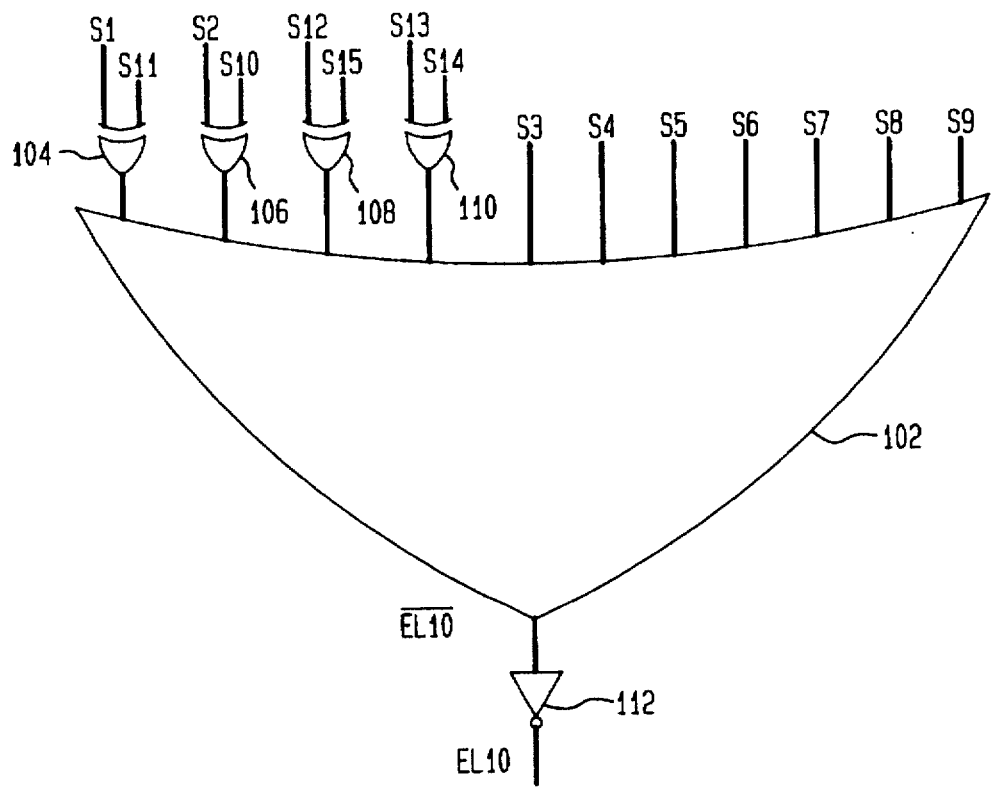
FIG. 10 is a logic diagram of the error logic using the calculated syndrome bits to indicate an error condition for column 10 of FIG. 4.

Implementation of the error logic (EL) using the calculated syndrome bits to indicate an error condition for column 10 in FIG. 4 is shown in FIG. 10. In particular, error logic bit EL10 is generated by exclusive OR gates 104, 106, 108 and 110 and OR gate 102. The output of the above four exclusive OR gates are equal to zeros if S1=S11, S2=S10, S12=S15 and S13=S14. Also, S3–S9 are input to OR gate 102. The output of OR gate 102, NOT EL10 (inverted), is equal to logic one if any of the inputs to OR gate 102 is equal to a one. The output of inverter 112 is EL10 will be equal to a one if the errors occur in column 10 of FIG. 4, or if there are no errors anywhere.

The next step is to identify the error condition and locate the error. For no errors, all EL's (EL1 through EL20, since there are 20 column in FIG. 4) are equal to ones. For an error in column 10, EL10 is equal to a one and all other EL's are equal to zeros. For errors in multiple columns, all EL's will be equal to zeros. To correct an error:
1. Locate the column containing the error.
2. Correct the errors as follows:

To correct D30 (EL10.S1)⊕ D30 or use (EL10.S11)⊕ D30 (EL10.S2)⊕ D29 or use (EL10.S10)⊕ D29 (EL10.S12)⊕ D31 or use (EL10.S15)⊕ D31 (EL10.S13)⊕ D32 or use (EL10.S14)⊕ D32

Figure 11:
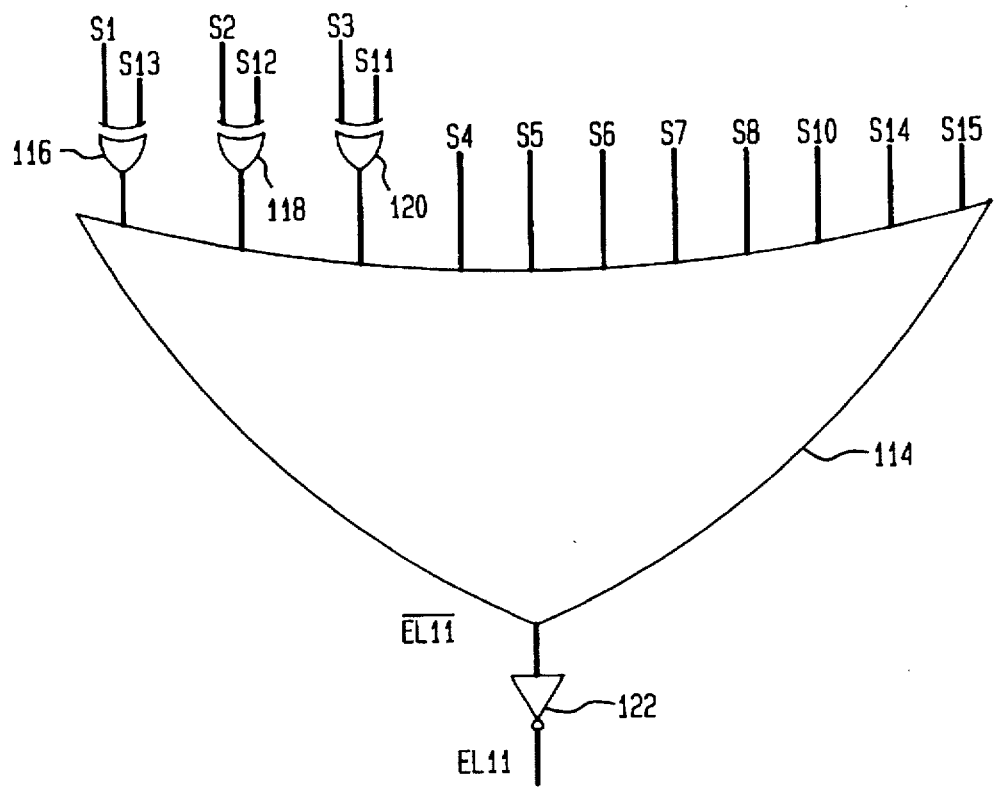
FIG. 11 is a logic diagram of the error logic using the calculated syndrome bits to indicate an error condition for column 11 of FIG. 4.

Implementation of the error logic (EL) using the calculated syndrome bits to indicate an error condition for column 11 in FIG. 4 is shown in FIG. 11. In particular, error logic bit EL11 is generated by exclusive OR gates 116, 118 and 120, and OR gate 114. The output of the latter three exclusive OR gates are equal to zeros if S1=S13, S2=S12, and S3=S11. Also, S4–S8, S10, S14 and S15 are input to OR gate 114. The output of OR gate 114, NOT EL11 (inverted), is equal to logic one if any of the inputs to OR gate 114 is equal to a one. The output of inverter 122 is EL11 will be equal to a one if the errors occur in column 11 of FIG. 4, or if there are no errors anywhere.

The error condition is identified and located as follows. For no errors, all EL's (EL1 through EL20) are equal to ones. For an error in column 11, EL11 is equal to a one and all other EL's are equal to zeros. For errors in multiple columns, all EL's will be equal to zeros. To correct an error:
1. Locate the column containing the error.
2. Correct the errors as follows:

To correct D35 (EL11.S1)⊕ D35 or use (EL11.S13)⊕ D35
To correct D34 (EL11.S2)⊕ D34 or use (EL11.S12)⊕ D34
To correct D33 (EL11.S3)⊕ D33 or use (EL11.S11)⊕ D33

11

To correct C9 (EL11.S9)⊕ C9

Figures 12, 13, 13A:
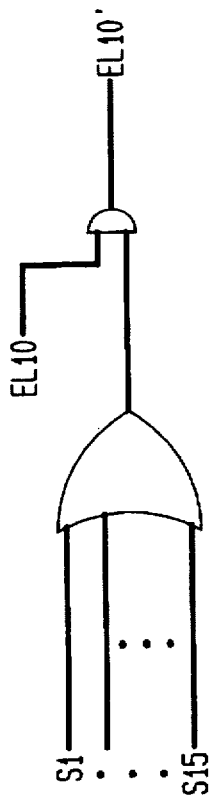
FIG. 12 is a chart showing the state of the error logic signals for the 20 columns of FIG. 4.
FIG. 13 is chart showing the state of the error logic signals for the 20 columns of FIG. 4 using a correction logic circuit.
FIG. 13A is a logic circuit for performing correction logic to avoid a false indication of error when all the syndrome bits are equal to zero.

The table in FIG. 12 shows the state of the error logic signals (EL) for 20 columns. Syndrome bits S=1 indicate an error, while syndrome bits=0 indicate no error. ELs indicate where the error is located. However, with no errors, all ELs will be ones, causing a false indication of error. This anomalous situation can be avoided by ANDing the ELs with an inclusive OR of all Ss (S1 through S15), as shown in the logic diagram of FIG. 13A and using the output EL' instead of the EL. In such manner, the ELs are set to zero when there are no errors, as shown in the table of FIG. 13.

FIG. 14 shows the relationship between the numbers of syndrome (Ss) bits indicating a one, and the numbers of error logic (EL) signals indicating a one. Zero S bits and zero EL bits represents no errors and correct data. One S bit and no EL bits indicates a single check bit, or one check bit and one data bit in error. Data may be correct. More than one check bit and no EL bits indicates multiple module errors, which is an uncorrectable condition. Note that zero or one S bit cannot occur with the number of EL bits equal to one. A group of errors occurring in a single module is indicated when more than one S bit is one and only one EL bit is one. Multiple single module errors are fully correctable.

Only the case of no ELs and exactly one S can cause problems. The use of a spare bit as a parity bit helps eliminate a number of the troublesome situations. If the data parity is good, then there is a single check bit in error and the data is good. If the data parity is bad, then there is one data bit and one check bit in error and the errors cannot be located or corrected.

2. GENERALIZED DESCRIPTION OF NEW EDAC METHOD

Given a memory data word width of P bits implemented by an integral number of modules b bits wide, the new EDAC method of the present invention is described by a k by m check bit equation table for which:

1. m=B/b
2. k is any positive integer such that (k)×(k−1)/2 is greater than B. [Note that (k)×(k−1)/2 is the number of possible 2-of-k codes.]
3. Each row contains one check bit computed from the data bits of that row in the manner of equation 1.
4. Each data bit appears in exactly two rows, and no other data bit appears in the same two rows.

In the prior art, each column contained a check bit, i.e., one per memory module. In the present embodiment, there may be more columns than check bits. One embodiment is to group all the columns with check bits in one group of adjacent columns, and all the columns without check bits in a second group of adjacent columns. However, simulation shows that if the columns without check bits are as far apart from each other as possible, the multiple module error detection is optimized, as compared to the case wherein the columns without check bits are adjacent to each other. In other words, it has been found experimentally that spacing the columns more or less evenly throughout the matrix, as compared to unevenly spacing or outright adjacent grouping, reduces the number of multiple module errors which appear as single module errors.

Address Translation and EDAC Combined Most modern computer systems implement virtual memory. See Milutinovic, Veljko, "High Level Language Computer Architecture", published 1989 by Computer Science Press, Inc. Virtual memory is a technique that allows programs to be written in a very large address space (for example, $2^{32}$ bytes=4 gigabytes), even though the physical memory of the computer system may be considerably

12 smaller (for example, $2^{29}$ bytes=512 megabytes). To the computer and programmer, the virtual memory space appears large and contiguous. The actual, physical memory space is composed of a variety of devices including high speed caches, RAM, ROM and one or more hard disks or other mass memory devices. Virtual memory is implemented by programmable memory management hardware, responsive to the address provided by the central processor, to manage the physical switching of memories and make the discontinuous memory hardware appear as one continuous virtual memory space.

There are many ways to implement virtual memory. One way is to provide a programmable memory, loaded for each application program when the application program is put into the computer's main memory for execution which translates between the application program's computed virtual addresses and the real addresses assigned to the application program by the computer's operating system.

Figure 7:
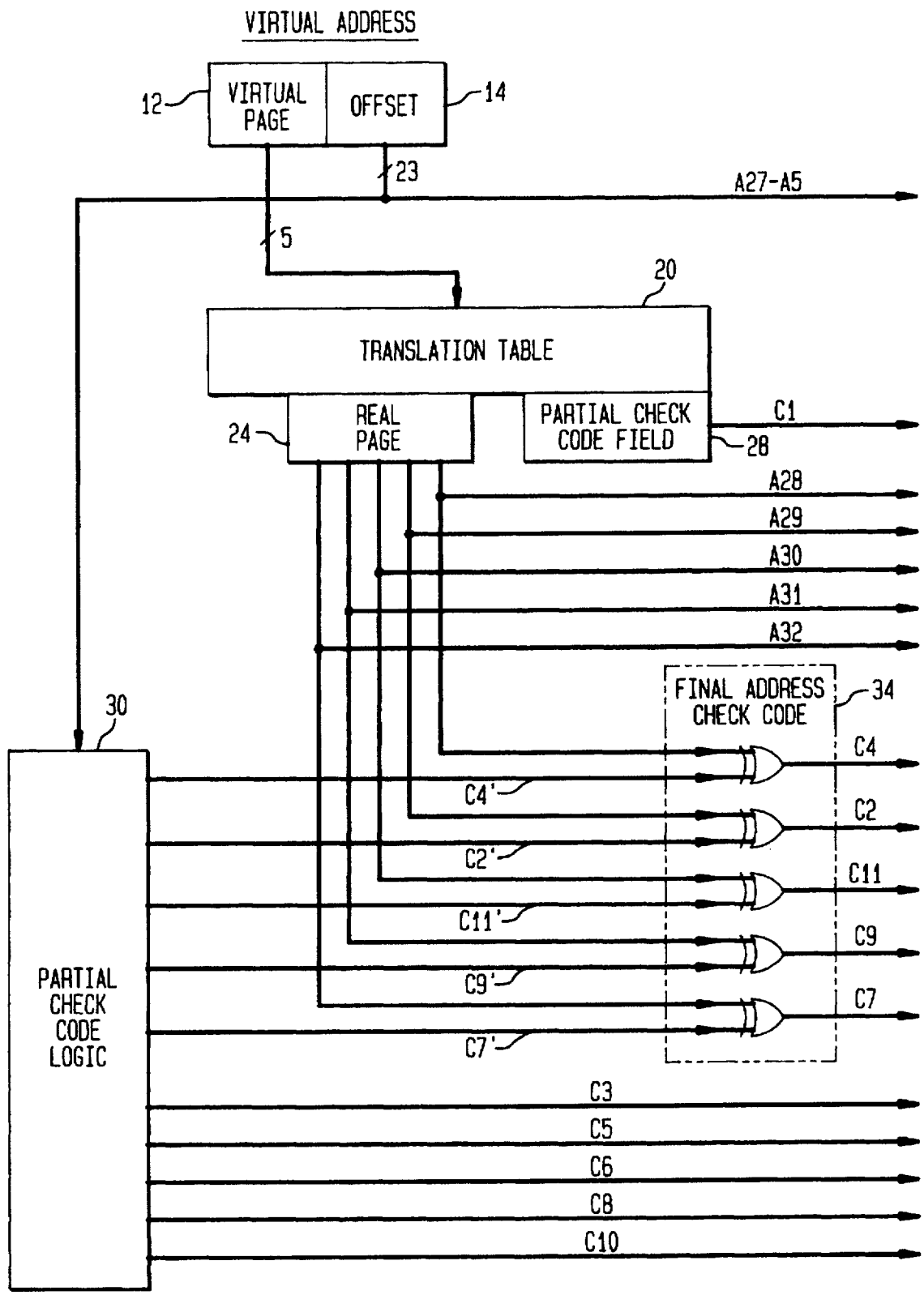
FIG. 7 is a logic diagram, partially in block form that illustrates the simultaneous and parallel operation of page translation and error detection and correction check bit generation in the addressing of a computer system according to the method of the present invention.

FIG. 7 is a logic diagram partially in block form illustrating virtual address circuitry that maps or translates the larger virtual address to the smaller real address space of each memory device. In the example of FIG. 7, both the N bit virtual address space and the 32 bit real address space are divided into 128 megabyte (227 bytes) 'pages', or contiguous blocks. The width of the data path to memory is assumed to be 128 bits or 16 bytes.

A processor generates a 32 bit virtual address that is composed of a 5 bit virtual page designator 12, a 23 bit offset designator 14 that selects a specific 128 bit word in the page, and a 4 bit pointer to a byte within the word (not shown in FIG. 7). The offset designator 14 is connected directly to the main bus to address the memory modules, and also to partial check code logic 30. The virtual page designator 12 is used to index a translation table 20. This translation table 20, maintained by the operating system and implemented with very high speed random access memory, generates a real page pointer 24 to a 128 megabyte page that actually exists in the real (physical) memory modules. The example system is capable of addressing 4 gigabytes, or 32 128 megabyte pages, of real memory, but typically there would be fewer real pages.

According to the present invention, the address bits A32 to A5 are protected by error detection and correction (EDAC) following the principles described above. An embodiment of an EDAC code for use with a 32 bit address having 11 check bits is shown in the table of FIG. 6. Each row of the table in FIG. 6 defines one of 11 check bit equations. Check bit C1 is pre-computed according to the first row of the table in FIG. 6, and stored in a partial check code field 28 of the translation table (reference 29 in FIG. 7). Check bits C3, C5, C6, C8, and C10 are computed in partial check code logic (30 in FIG. 7). The partial check code logic 30 also computes part of the equations for C4', C2', C1', C9', and C7'. These last five check bit computations are completed by final check code logic 34 using the address bits of real page pointer 24. Specifically:

$$C4'=A27 \oplus A13 \oplus A9 \oplus A7 \oplus A6 \qquad \text{[EQ 3]}$$

$$C4=C4' \oplus A28 \qquad \text{[EQ 4]}$$

Check bits C2, C11, C9, and C7 are computed similarly according to their respective rows in the table of FIG. 6.

Figure 9:
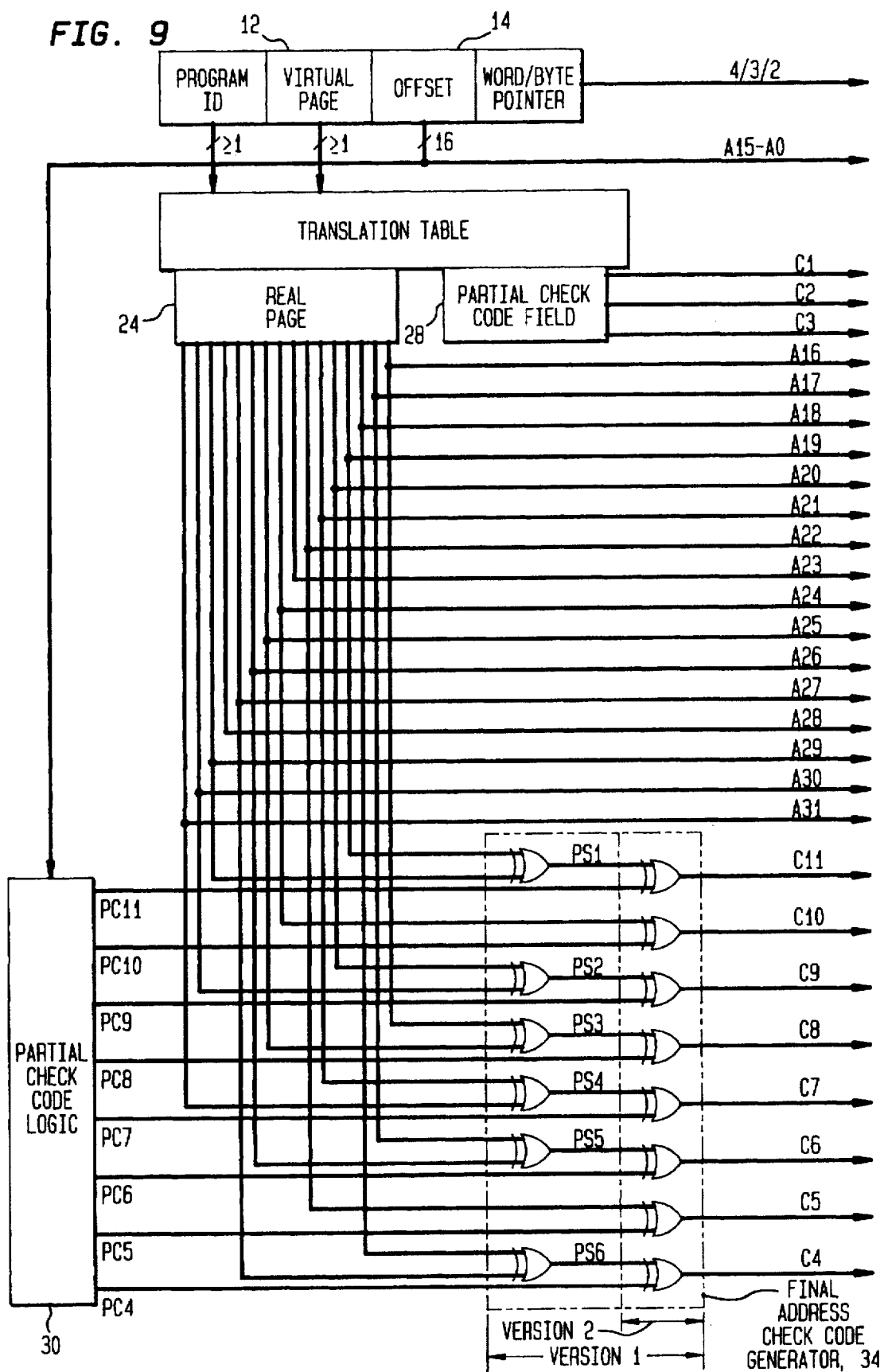
FIG. 9 is an alternate embodiment of a logic diagram, partially in block form that illustrates the simultaneous and parallel operation of page translation and error detection and correction check bit generation in the addressing of a computer system according to the method of the present invention.

FIG. 9 is a n alternate embodiment of a logic diagram partially in block form illustrating virtual address circuitry that maps or translates the larger virtual address to the smaller real address space of each memory device. In the example of FIG. 9, both the N bit virtual address space and the 32 bit real address space are divided in to 64 megabyte ($2^{16}$ bytes) 'pages', or contiguous blocks. The width of the data path to memory is assumed to be either 128 bits or 16 bytes, 64 bits or 8 bytes, or 32 bits or 4 bytes for which there is a data EDAC code.

A processor gene rates a 32 bit virtual address that is composed of a 16 bit virtual page designator 12, a 16 bit offset designator 14 that selects a specific word in the page, and a pointer to a byte within the word (not shown in FIG. 9)s The offset designator 14 is connected directly to the main bus to address the memory modules, and also to partial check code logic 30. The virtual page designator 12 is used to index a translation table 20. The translation table 20, maintained by the operating system and implemented with very high speed random access memory, generates a real page pointer 24 to a specific page that actually exists in the real (physical) memory modules. The example system is capable of addressing 65K pages.

According to the present invention, the address bits sent to the memory module are protected by error detection and correction (EDAC) following the principles described above. An embodiment of an EDAC code for use with a 32 bit address having 11 check bits is shown in the table of FIG. 8. Each row of the table in FIG. 8 defines one of 11 check bit equations. Check bit C1 is precomputed according to the first row of the table in FIG. 8, and stored in a partial check code field 28 of the translation table (reference 29 in FIG. 9). The partial check code logic 30 also computes part of the equations for C4' through C11'. The last eight check bit computations are completed by final check code logic 34 using the address bits of real page pointer 24. Check bits C2, C11, C9, and C7 are computed similarly according to their respective rows in the table of FIG. 8. Specifically:

C1=A31 ⊕ A30 ⊕ A29 ⊕ A28 ⊕ A27 ⊕ A26

C2=A25 ⊕ A24 ⊕ A28 ⊕ A23 ⊕ A22 ⊕ A21

C3=A20 ⊕ A19 ⊕ A23 ⊕ A18 ⊕ A17 ⊕ A16

PS1=A19 ⊕ A29

PS2=A20 ⊕ A30

PS3=A16 ⊕ A25

PS4=A21 ⊕ A31

PS5=A17 ⊕ A26

PS6=A18 ⊕ A27

A11=A5 ⊕ A2 ⊕ A0 ⊕ A12

PC10=A8 ⊕ A4 ⊕ A1 ⊕ A0 ⊕ A15

PC9=A11 ⊕ A7 ⊕ A3 ⊕ A1

PC8=A10 ⊕ A6 ⊕ A3 ⊕ A2

PC7=A9 ⊕ A6 ⊕ A4 ⊕ A13

PC6=A9 ⊕ A7 ⊕ A5

PC5=A10 ⊕ A8 ⊕ A12 ⊕ A14

PC4=A11 ⊕ A15 ⊕ A14 ⊕ A13

C4=PS6 ⊕ PC4

C5=A22 ⊕ PC5

C6=PS5 ⊕ PC6

C7=PS4 ⊕ PC7

C8=PS3 ⊕ PC8

C9=PS2 ⊕ PC9

C10=A24 ⊕ PC10

Alternate embodiments of the present invention are shown in FIGS. 6A, 6B and 6C. In FIG. 6A, a check bit code generation table constructed in accordance with the prior Srinivasan method is illustrated. In FIG. 62, spaces have been created in the table by setting bits D4, D8, D12, D16, D20, D24, D28, D32, D36, D40 and D44 to zero, and renumbering the remaining bits in consecutive order. The effect is to create a shortened matrix with a second diagonal of zeros in the check bit generation table, resulting in 11 check bits, 33 data bits and 4 bits per memory module.

Similarly, in FIG. 6C, spaces have been created in the table by setting bits D4, D8, D12, D15, D18, D21, D25, D30, D35, D40 and D44 to zero, and renumbering the remaining bits in consecutive order. The effect is to create a shortened matrix with a first row of zeros in the check bit generation table, resulting in 10 check bits, 33 data bits and 4 bits per memory module. Check bit C1 is always zero and is therefore eliminated. By removing the constraints imposed by Srinivasan, numerous potentially useful code genertion tables may be constructed. FIG. 7 logic uses the check bit generation table of FIG. 6 to compute the error check bits and EDAC logic for the page address, which is the upper 28 bits of the 32 bit virtual address bits. FIG. 8 logic uses the check bit generation table of FIGS. 6C or FIG. 6 to compute the error check bits and EDAC logic for the page address.

In operation for both FIG. 7 and 9, the bits of the virtual page address 12 is applied to the translation table 20 which generates the real page from a high speed memory. Also the first check bits (C1 for FIG. 7) or (C1, C2, C3 for FIG. 9) is looked up, having been precomputed when the translation table is loaded. The 23 bit offset address 14 (16 bits in FIG. 9) is applied to a partial check code logic circuit 30 which is typically implemented in dedicated logic consisting of exclusive OR gates. Partial check code logic 30 generates partial check bits C7', C9', C11', C2' and C4', as well as final check bits C3, C5, C6, C8 and C10 (also PS4–PS11 for FIG. 9). The computation of the final check bits C7, C9, C11, C2 and C4, (C4–C11 for FIG. 9) require exclusive OR logic 34 with only one or two gate delays. In FIG. 9, version 1 of the final address check code generator 34 has two gate delays. Version 2 corresponds to the one gate delay final address check code generator 34 from FIG. 7.

The advantage of the virtual memory arrangement illustrated in FIGS. 7 and 9 is that part of the check bit computations are completed in parallel with the operational delay of the translation table 20. Thereafter, final check bit encoding requires only the gate delay of exclusive OR functions of the final address check code logic 34. Prior art methods did not add check bits to the address bits, but instead performed all check bit computation after the address translation, which added substantially to the memory access delay. In the present invention, the sharing of circuit delay for both virtual address translation and partial EDAC encoding, allows effective EDAC encoding of the address bus without significant increase in the access delay of the virtual memory system.

Although the check bit generation table used in the foregoing embodiment computes check bits across the whole virtual address, i.e. across both virtual page address 12 and offset page address 14, a separate EDAC may be used for the virtual page address 12, with another EDAC used for the offset address 14. The partial check code field 28 would generate check bits just for the real page address. The partial check code logic 30 would generate check bits just for the offset address. As a result, the final address check code 34 would be eliminated. While the virtual address translation technique is illustrated for use with the disclosed EDAC logic, it also may be used with other EDAC codes.

What is claimed is:

1. A method for correcting errors in the transmission of information bits said method comprising;

arranging said information bits into subsets such that each information bit is included in two subsets, to form a pair of subsets, and no two information bits are contained within the same pair of subsets, and wherein the number of subsets is other than a prime number;

generating a check bit for each subset of said information bits wherein the number of check bits is other than a prime number;

transmitting said check bits and said information bits as a plurality of blocks of bits, each of said plurality of blocks consisting of a group of information bits and no more than one check bit which is not associated with any information bit in its block;

receiving said plurality of blocks and generating the exclusive OR of said bits of each of said plurality of blocks to form a syndrome pattern indicative of whether there are one or more errors in only a single block of said plurality of blocks;

producing responsive to said syndrome pattern, a plurality of error indicator outputs indicative of whether there is an error in one or more of said information bits; and producing responsive to said plurality of error indicator outputs and to said blocks of bits, output information bits which are the same value as the corresponding transmitted information bits.

2. A method for correcting errors in the transmission of information bits, said method comprising:

selecting subsets of said information bits where said subsets are rows in a matrix having columns and rows, each column of said matrix containing information bits selected such that each information bit is included in two rows, to form a pair of rows, and no two information bits are contained within the same pair of rows and wherein the number of subsets is other than a prime number;

generating a parity bit for each row of said matrix corresponding to each said subset of information bits wherein the number of parity bits is other than a prime number;

transmitting a plurality of blocks of bits, each of said plurality of blocks of bits consisting of the information bits in each respective column of said matrix and no more than one parity bit which is not associated with any information bit in said respective column;

receiving said plurality of blocks for generating the exclusive OR of said bits of each of said plurality of blocks to form a syndrome pattern indicative of whether there are one or more errors in only a single block of said plurality of blocks;

producing responsive to said syndrome pattern a plurality of error indicator outputs indicative of whether there is an error in one or more of said information bits; and producing responsive to said plurality of error indicator outputs and to said blocks of bits, output information bits which are the same value as the corresponding transmitted information bits.

3. A method for correcting errors in the transmission of information bits said method comprising;

arranging said information bits into subsets such that each information bit is included in two subsets, to form a pair of subsets, and no two information bits are contained within the same pair of subsets;

generating a check bit for each subset of said information bits;

transmitting said check bits and said information bits as a plurality of blocks of bits, each of said plurality of blocks consisting of a group of information bits, and wherein the number of check bits is not equal to the number of said plurality of blocks, whereby some of said plurality of blocks have a check bit and others of said plurality of blocks have no check bit;

receiving said plurality of blocks and generating the exclusive OR of said bits of each of said plurality of blocks to form a syndrome pattern indicative of whether there are one or more errors in only a single block of said plurality of blocks;

producing responsive to said syndrome pattern, a plurality of error indicator outputs indicative of whether there is an error in one or more of said information bits; and producing responsive to said plurality of error indicator outputs and to said blocks of bits, output information bits which are the same value as the corresponding transmitted information bits.

4. A method in accordance with claim 3, where the number of said plurality of blocks of bits is greater than the number of said check bits, and wherein at least two of said others of said plurality of blocks which have no check bit are spaced apart and have at least one of said plurality of blocks which has a check bit therebetween.

5. A method for correcting errors in the transmission of information bits, said method comprising:

selecting subsets of said information bits where said subsets are rows in a matrix having columns and rows, each column of said matrix containing information bits selected such that each information bit is included in two rows, to form a pair of rows, and no two information bits are contained within the same pair of rows;

generating a parity bit for each row of said matrix corresponding to each said subset of information bits;

transmitting a plurality of blocks of bits, each of said plurality of blocks of bits consisting of the information bits in each respective column of said matrix, and wherein the number of parity bits is not equal to the number of said plurality of blocks, whereby some of said columns have a parity bit and others of said columns have no parity bit;

receiving said plurality of blocks for generating the exclusive OR of said bits of each of said plurality of blocks to form a syndrome pattern indicative of whether there are one or more errors in only a single block of said plurality of blocks;

producing responsive to said syndrome pattern a plurality of error indicator outputs indicative of whether there is an error in one or more of said information bits; and producing responsive to said plurality of error indicator outputs and to said blocks of bits, output information bits which are the same value as the corresponding transmitted information bits.

6. A method in accordance with claim 5, where the number of said plurality of blocks of bits is greater than the number of said parity bits, and wherein at least two of said others of said columns which have no parity bit are spaced apart and have at least one of said columns which has a parity bit therebetween.

7. A method for correcting errors in the transmission of information bits said method comprising;

arranging said information bits into subsets such that each information bit is included in two subsets, to form a pair of subsets, and no two information bits are contained within the same pair of subsets;

generating a check bit for each subset of said information bits;

transmitting said check bits and said information bits as a plurality of blocks of bits, each of said plurality of blocks consisting of a group of information bits, and wherein the number of check bits is not equal to the number of said plurality of blocks, whereby some of said plurality of blocks have a check bit and others of said plurality of blocks have no check bit, and further wherein at least two of said plurality of blocks have at least one unused bit;

receiving said plurality of blocks and generating the exclusive OR of said bits of each of said plurality of blocks to form a syndrome pattern indicative of whether there are one or more errors in only a single block of said plurality of blocks;

producing responsive to said syndrome pattern, a plurality of error indicator outputs indicative of whether there is an error in one or more of said information bits; and producing responsive to said plurality of error indicator outputs and to said blocks of bits, output information bits which are the same value as the corresponding transmitted information bits.

8. A method in accordance with claim 7, where the number of said plurality of blocks of bits is greater than the number of said check bits, and wherein said two of said plurality of blocks having at least one unused bit are spaced apart and have at least one of said plurality of blocks which has a check bit therebetween.

9. A method for correcting errors in the transmission of information bits, said method comprising:

selecting subsets of said information bits where said subsets are rows in a matrix having columns and rows, each column of said matrix containing information bits selected such that each information bit is included in two rows, to form a pair of rows, and no two information bits are contained within the same pair of rows;

generating a parity bit for each row of said matrix corresponding to each said subset of information bits;

transmitting a plurality of blocks of bits, each of said plurality of blocks of bits consisting of the information bits in each respective column of said matrix, and wherein the number of parity bits is not equal to the number of said plurality of blocks, whereby some of said columns have a parity bit and others of said columns have no parity bit, and further wherein at least two of said columns have at least one unused bit;

receiving said plurality of blocks for generating the exclusive OR of said bits of each of said plurality of blocks to form a syndrome pattern indicative of whether there are one or more errors in only a single block of said plurality of blocks;

producing responsive to said syndrome pattern a plurality of error indicator outputs indicative of whether there is an error in one or more of said information bits; and producing responsive to said plurality of error indicator outputs and to said blocks of bits, output information bits which are the same value as the corresponding transmitted information bits.

10. A method in accordance with claim 9, where the number of said plurality of blocks of bits is greater than the number of said parity bits, and wherein said two of said others of said columns which have an unused bit are spaced apart and have at least one of said columns which has a parity bit therebetween.

11. In a computer and memory system having a virtual address translation memory for translating virtual addresses to real addresses, said virtual address including a virtual page address, an error correction and detection system encoder method comprising:

computing at least a portion of the real page address corresponding to said virtual page address;

computing at least one check bit corresponding to said real page address; and storing said portion of said real page address and said check bit in said virtual address translation memory.

12. A method in accordance with claim 11, wherein said computer memory system further includes a main bus connecting said computer to said memory, said method further comprising the steps of:

applying said virtual address to said virtual address translation unit;

outputting said portion of said real page address stored in said virtual address translation unit on said main bus; and outputting said check bit stored in said virtual address translation unit on said main bus.

13. A method in accordance with claim 12, wherein said virtual address further includes an offset address, said method further comprising:

computing, responsive to said offset address, an error detection and correction code comprising a plurality of check bits; and outputting said plurality of check bits on said main bus.

14. In a computer and memory system having a virtual address translation memory for translating virtual addresses to real addresses, said virtual address including a virtual page address and an offset address, said system further including a main bus connecting said computer to said memory, an error correction and detection system encoder method comprising:

computing at least a portion of the real page address corresponding to said virtual page address;

storing said portion of said real page address in said virtual address translation memory;

applying said virtual address to said virtual address translation unit;

outputting said portion of said real page address stored in said virtual address translation unit on said main bus;

computing, responsive to said offset address, a partial error detection and correction code;

computing, responsive to said partial error detection and correction code, and to said real page address, a complete error detection and correction code; and outputting said complete error detection and correction code on said main bus.

15. An apparatus for correcting errors in the transmission of information bits said apparatus comprising;

means for arranging said information bits into subsets such that each information bit is included in two subsets, to form a pair of subsets, and no two information bits are contained within the same pair of subsets, and wherein the number of subsets is other than a prime number;

means for generating a check bit for each subset of said information bits wherein the number of check bits is other than a prime number;

means for transmitting said check bits and said information bits as a plurality of blocks of bits, each of said plurality of blocks consisting of a group of information bits and no more than one check bit which is not associated with any information bit in its block;

means for receiving said plurality of blocks and generating the exclusive OR of said bits of each of said plurality of blocks to form a syndrome pattern indicative of whether there are one or more errors in only a single block of said plurality of blocks;

means for producing responsive to said syndrome pattern, a plurality of error indicator outputs indicative of whether there is an error in one or more of said information bits; and means for producing responsive to said plurality of error indicator outputs and to said blocks of bits, output information bits which are the same value as the corresponding transmitted information bits.

16. An apparatus for correcting errors in the transmission of information bits, said apparatus comprising:

means for selecting subsets of said information bits where said subsets are rows in a matrix having columns and rows, each column of said matrix containing information bits selected such that each information bit is included in two rows, to form a pair of rows, and no two information bits are contained within the same pair of rows and wherein the number of subsets is other than a prime number;

means for generating a parity bit for each row of said matrix corresponding to each said subset of information bits wherein the number of parity bits is other than a prime number;

means for transmitting a plurality of blocks of bits, each of said plurality of blocks of bits consisting of the information bits in each respective column of said matrix and no more than one parity bit which is not associated with any information bit in said respective column;

means for receiving said plurality of blocks for generating the exclusive OR of said bits of each of said plurality of blocks to form a syndrome pattern indicative of whether there are one or more errors in only a single block of said plurality of blocks;

means for producing responsive to said syndrome pattern a plurality of error indicator outputs indicative of whether there is an error in one or more of said information bits; and means for producing responsive to said plurality of error indicator outputs and to said blocks of bits, output information bits which are the same value as the corresponding transmitted information bits.

17. An apparatus for correcting errors in the transmission of information bits said apparatus comprising;

means for arranging said information bits into subsets such that each information bit is included in two subsets, to form a pair of subsets, and no two information bits are contained within the same pair of subsets;

means for generating a check bit for each subset of said information bits;

means for transmitting said check bits and said information bits as a plurality of blocks of bits, each of said plurality of blocks consisting of a group of information bits, and wherein the number of check bits is not equal to the number of said plurality of blocks, whereby some of said plurality of blocks have a check bit and others of said plurality of blocks have no check bit;

means for receiving said plurality of blocks and generating the exclusive OR of said bits of each of said plurality of blocks to form a syndrome pattern indicative of whether there are one or more errors in only a single block of said plurality of blocks;

means for producing responsive to said syndrome pattern, a plurality of error indicator outputs indicative of whether there is an error in one or more of said information bits; and means for producing responsive to said plurality of error indicator outputs and to said blocks of bits, output information bits which are the same value as the corresponding transmitted information bits.

18. An apparatus in accordance with claim 17, where the number of said plurality of blocks of bits is greater than the number of said check bits, and wherein at least two of said others of said plurality of blocks which have no check bit are spaced apart and have at least one of said plurality of blocks which has a check bit therebetween.

19. An apparatus for correcting errors in the transmission of information bits, said apparatus comprising:

means for selecting subsets of said information bits where said subsets are rows in a matrix having columns and rows, each column of said matrix containing information bits selected such that each information bit is included in two rows, to form a pair of rows, and no two information bits are contained within the same pair of rows;

means for generating a parity bit for each row of said matrix corresponding to each said subset of information bits;

means for transmitting a plurality of blocks of bits each of said plurality of blocks of bits consisting of the information bits in each respective column of said matrix, and wherein the number of parity bits is not equal to the number of said plurality of blocks, whereby some of said columns have a parity bit and others of said columns have no parity bit;

means for receiving said plurality of blocks for generating the exclusive OR of said bits of each of said plurality of blocks to form a syndrome pattern indicative of whether there are one or more errors in only a single bloc k of said plurality of blocks;

means for producing responsive to said syndrome pattern a plurality of error indicator outputs indicative of whether there is an error in one or more of said information bits; and means for producing responsive to said plurality of error indicator outputs and to said blocks of bits, output information bits which are the same value as the corresponding transmitted information bits.

20. An apparatus in accordance with claim 19, where the number of said plurality of blocks of bits is greater than the number of said parity bits, and wherein at least two of said others of said columns which have no parity bit are spaced apart and have at least one of said columns which has a parity bit therebetween.

21. An apparatus for correcting errors in the transmission of information bits said apparatus comprising;

means for arranging said information bits into subsets such that each information bit is included in two subsets, to form a pair of subsets, and no two information bits are contained within the same pair of subsets;

means for generating a check bit for each subset of said information bits;

means for transmitting said check bits and said information bits as a plurality of blocks of bits, each of said plurality of blocks consisting of a group of information bits, and wherein the number of check bits is not equal to the number of said plurality of blocks, whereby some of said plurality of blocks have a check bit and others of said plurality of blocks have no check bit, and further wherein at least two of said plurality of blocks have at least one unused bit;

means for receiving said plurality of blocks and generating the exclusive OR of said bits of each of said plurality of blocks to form a syndrome pattern indicative of whether there are one or more errors in only a single block of said plurality of blocks;

means for producing responsive to said syndrome pattern, a plurality of error indicator outputs indicative of whether there is an error in one or more of said information bits; and means for producing responsive to said plurality of error indicator outputs and to said blocks of bits, output information bits which are the same value as the corresponding transmitted information bits.

22. An apparatus in accordance with claim 21, where the number of said plurality of blocks of bits is greater than the number of said check bits, and wherein said two of said plurality of blocks having at least one unused bit are spaced apart and have at least one of said plurality of blocks which has a check bit therebetween.

23. An apparatus for correcting errors in the transmission of information bits, said apparatus comprising:

means for selecting subsets of said information bits where said subsets are rows in a matrix having columns and rows, each column of said matrix containing information bits selected such that each information bit is included in two rows, to form a pair of rows, and no two information bits are contained within the same pair of rows;

means for generating a parity bit for each row of said matrix corresponding to each said subset of information bits;

means for transmitting a plurality of blocks of bits, each of said plurality of blocks of bits consisting of the information bits in each respective column of said matrix, and wherein the number of parity bits is not equal to the number of said plurality of blocks, whereby some of said columns have a parity bit and others of said columns nave no parity bit, and further wherein at least two of said columns have at least one unused bit;

means for receiving said plurality of blocks for generating the exclusive OR of said bits of each of said plurality of blocks to form a syndrome pattern indicative of whether there are one or more errors in only a single block of said plurality of blocks;

means for producing responsive to said syndrome pattern a plurality of error indicator outputs indicative of whether there is an error in one or more of said information bits; and means for producing responsive to said plurality of error indicator outputs and to said blocks of bits, output information bits which are the same value as the corresponding transmitted information bits.

24. An apparatus in accordance with claim 23, where the number of said plurality of blocks of bits is greater than the number of said parity bits, and wherein said two of said others of said columns which have an unused bit are spaced apart and have at least one of said columns which has a parity bit therebetween.

25. In a computer and memory system having a virtual address translation memory for translating virtual addresses to real addresses, said virtual address including a virtual page address, an error correction and detection system encoder apparatus comprising:

means for computing at least a portion of the real page address corresponding to said virtual page address;

means for computing at least one check bit corresponding to said real page address; and means for storing said portion of said real page address and said check bit in said virtual address translation memory.

26. An apparatus in accordance with claim 25, wherein said computer memory system further includes a main bus connecting said computer to said memory, said apparatus further comprising:

means for applying said virtual address to said virtual address translation unit;

means for outputting said portion of said real page address stored in said virtual address translation unit on said main bus; and means for outputting said check bit stored in said virtual address translation unit on said main bus.

27. An apparatus in accordance with claim 26, wherein said virtual address further includes an offset address, said apparatus further comprising:

means for computing, responsive to said offset address, an error detection and correction code comprising a plurality of check bits; and means for outputting said plurality of check bits on said main bus.

28. In a computer and memory system having a virtual address translation memory for translating virtual addresses to real addresses, said virtual address including a virtual page address and an offset address, said system further including a main bus connecting said computer to said memory, an error correction and detection system encoder apparatus comprising:

means for computing at least a portion of the real page address corresponding to said virtual page address;

means for storing said portion of said real page address in said virtual address translation memory;

means for applying said virtual address to said virtual address translation unit;

means for outputting said portion of said real page address stored in said virtual address translation unit on said main bus;

means for computing, responsive to said offset address, a partial error detection and correction code;

means for computing, responsive to said partial error detection and correction code, and to said real page address, a complete error detection and correction code; and means for outputting said complete error detection and correction code on said main bus.

29. A method for correcting errors in the transmission of information bits said method comprising;

arranging said information bits into subsets such that each information bit is included in two subsets, to form a pair of subsets, and no two information bits are contained within the same pair of subsets;

generating a check bit for each subset of said information bits;

transmitting said check bits and said information bits as a plurality of blocks of bits, each of said plurality of blocks consisting of a group of information bits and no more than one check bit which is not associated with any information bit in its block;

receiving said plurality of blocks and generating the exclusive OR of said bits of each of said plurality of blocks to form a syndrome pattern indicative of whether there are one or more errors in only a single block of said plurality of blocks;

producing responsive to said syndrome pattern, a plurality of error indicator outputs indicative of whether there is an error in one or more of said information bits;

generating the inclusive OR of said syndrome pattern;

generating the AND function of each of said error indicator outputs and said inclusive OR of said syndrome pattern; and producing responsive to said AND function of said plurality of error indicator outputs and to said blocks of bits, output information bits which are the same value as the corresponding transmitted information bits.

30. A method for correcting errors in the transmission of information bits, said method comprising:

selecting subsets of said information bits where said subsets are rows in a matrix having columns and rows, each column of said matrix containing information bits selected such that each information bit is included in two rows, to form a pair of rows, and no two information bits are contained within the same pair of rows;

generating a parity bit for each row of said matrix corresponding to each said subset of information bits;

transmitting a plurality of blocks of bits, each of said plurality of blocks of bits consisting of the information bits in each respective column of said matrix and no more than one parity bit which is not associated with any information bit in said respective column;

receiving said plurality of blocks for generating the exclusive OR of said bits of each of said plurality of blocks to form a syndrome pattern indicative of whether there are one or more errors in only a single block of said plurality of blocks;

producing responsive to said syndrome pattern a plurality of error indicator outputs indicative of whether there is an error in one or more of said information bits;

generating the inclusive OR of said syndrome pattern;

generating the AND function of each of said error indicator outputs and said inclusive OR of said syndrome pattern; and producing responsive to said AND function of said plurality of error indicator outputs and to said blocks of bits, output information bits which are the same value as the corresponding transmitted information bits.

31. An apparatus for correcting errors in the transmission of information bits said apparatus comprising;

means for arranging said information bits into subsets such that each information bit is included in two subsets, to form a pair of subsets, and no two information bits are contained within the same pair of subsets;

means for generating a check bit for each subset of said information bits;

means for transmitting said check bits and said information bits as a plurality of blocks of bits, each of said plurality of blocks consisting of a group of information bits and no more than one check bit which is not associated with any information bit in its block;

means for receiving said plurality of blocks and generating the exclusive OR of said bits of each of said plurality of blocks to form a syndrome pattern indicative of whether there are one or more errors in only a single block of said plurality of blocks;

means for producing responsive to said syndrome pattern, a plurality of error indicator outputs indicative of whether there is an error in one or more of said information bits;

means for generating the inclusive OR of said syndrome pattern;

means for generating the AND function of each of said error indicator outputs and said inclusive OR of said syndrome pattern; and means for producing responsive to said AND function of said plurality of error indicator outputs and to said blocks of bits, output information bits which are the same value as the corresponding transmitted information bits.

32. An apparatus for correcting errors in the transmission of information bits, said apparatus comprising:

means for selecting subsets of said information bits where said subsets are rows in a matrix having columns and rows, each column of said matrix containing information bits selected such that each information bit is included in two rows, to form a pair of rows, and no two information bits are contained within the same pair of rows;

means for generating a parity bit for each row of said matrix corresponding to each said subset of information bits;

means for transmitting a plurality of blocks of bits, each of said plurality of blocks of bits consisting of the information bits in each respective column of said matrix and no more than one parity bit which is not associated with any information bit in said respective column;

means for receiving said plurality of blocks for generating the exclusive OR of said bits of each of said plurality of blocks to form a syndrome pattern indicative of whether there are one or more errors in only a single block of said plurality of blocks;

means for producing responsive to said syndrome pattern a plurality of error indicator outputs indicative of whether there is an error in one or more of said information bits;

means for generating the inclusive OR of said syndrome pattern;

means for generating the AND function of each of said error indicator outputs and said inclusive OR of said syndrome pattern; and means for producing responsive to said AND function of said plurality of error indicator outputs and to said blocks of bits, output information bits which are the same value as the corresponding transmitted information bits.

* * * * *